(12) United States Patent
Jayapala et al.

(10) Patent No.: US 9,217,861 B2
(45) Date of Patent: Dec. 22, 2015

(54) MICRO-MIRROR ARRAYS

(71) Applicant: IMEC VZW, Leuven (BE)

(72) Inventors: Murali Jayapala, Leuven (BE); Geert Van der Plas, Leuven (BE); Veronique Rochus, Leige (BE); Xavier Rottenberg, Kessel-Lo (BE); Simone Severi, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 14/373,071

(22) PCT Filed: Jan. 18, 2013

(86) PCT No.: PCT/EP2013/050982
§ 371 (c)(1),
(2) Date: Jul. 18, 2014

(87) PCT Pub. No.: WO2013/107890
PCT Pub. Date: Jul. 25, 2013

(65) Prior Publication Data
US 2014/0368920 A1 Dec. 18, 2014

(30) Foreign Application Priority Data

Jan. 20, 2012 (EP) .................................... 12152011
Jan. 20, 2012 (EP) .................................... 12152013
Jan. 20, 2012 (EP) .................................... 12152015

(51) Int. Cl.
*G02B 26/00* (2006.01)
*G02B 27/10* (2006.01)
(Continued)

(52) U.S. Cl.
CPC ........ *G02B 26/0833* (2013.01); *G02B 17/0896* (2013.01); *G02B 26/08* (2013.01);
(Continued)

(58) Field of Classification Search
CPC ............... G02B 26/08; G02B 26/0825; G02B 26/0833; G02B 26/0841; G02B 27/00; G02B 27/10; G02B 17/0896; G02B 7/182; G02B 5/08; H04N 13/04; H04N 13/042; H04N 13/0427
USPC ......... 359/290–295, 298, 237, 625–627, 846, 359/850, 854, 855, 872; 324/679
See application file for complete search history.

(56) References Cited

U.S. PATENT DOCUMENTS 6,538,802 B2 *  3/2003  Wang et al. .................... 359/298
6,958,850 B2 * 10/2005  Sane et al. ..................... 359/298
(Continued)

FOREIGN PATENT DOCUMENTS

WO      2009/032347 A1     3/2009

OTHER PUBLICATIONS

International Search Report and Written Opinion, PCT International Application No. PCT/EP2013/050982, dated Jul. 30, 2013.

*Primary Examiner* — Loha Ben
(74) *Attorney, Agent, or Firm* — McDonnell Boehnen Hulbert & Berghoff LLP

(57) ABSTRACT

Micro-mirror arrays configured for use in a variable focal length lens are described herein. An example variable focal length lens comprises a micro-mirror array having a plurality of micro-mirror elements arranged in at least a first section and a second section. Each micro-mirror element has a tilt axis and comprises, on each of two opposing sides of the tilt axis, (i) at least one actuation electrode, (ii) at least one measurement electrode, and (iii) at least one stopper. Additionally, each micro-mirror element in the first section has a first tilt angle range, and each micro-mirror element in the second section has a second tilt angle range, with the first tilt angle range being less than the second tilt angle range.

7 Claims, 23 Drawing Sheets

(51) Int. Cl.
*G02B 5/08* (2006.01)
*G02B 26/08* (2006.01)
*G02B 17/08* (2006.01)
*H04N 13/04* (2006.01)
*G02B 7/182* (2006.01)

(52) U.S. Cl.
CPC ............ *G02B 27/10* (2013.01); *H04N 13/042* (2013.01); *G02B 5/08* (2013.01); *G02B 7/182* (2013.01); *G02B 26/0825* (2013.01); *G02B 26/0841* (2013.01); *H04N 13/0427* (2013.01)

(56) References Cited

U.S. PATENT DOCUMENTS

| | | | |
|---|---|---|---|
| 7,046,447 B2 * | 5/2006 | Raber | 359/625 |
| 7,488,082 B2 * | 2/2009 | Kim et al. | 359/855 |
| 2003/0025982 A1 | 2/2003 | Wang et al. | |
| 2003/0174376 A1 | 9/2003 | Sane et al. | |
| 2003/0214639 A1 | 11/2003 | Patel et al. | |
| 2004/0063325 A1 | 4/2004 | Urano et al. | |
| 2008/0137173 A1 | 6/2008 | Kim et al. | |
| 2009/0185085 A1 | 7/2009 | Arai et al. | |

\* cited by examiner

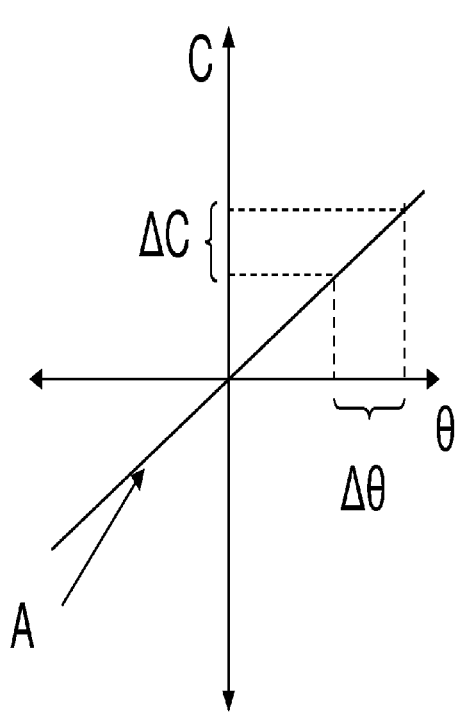
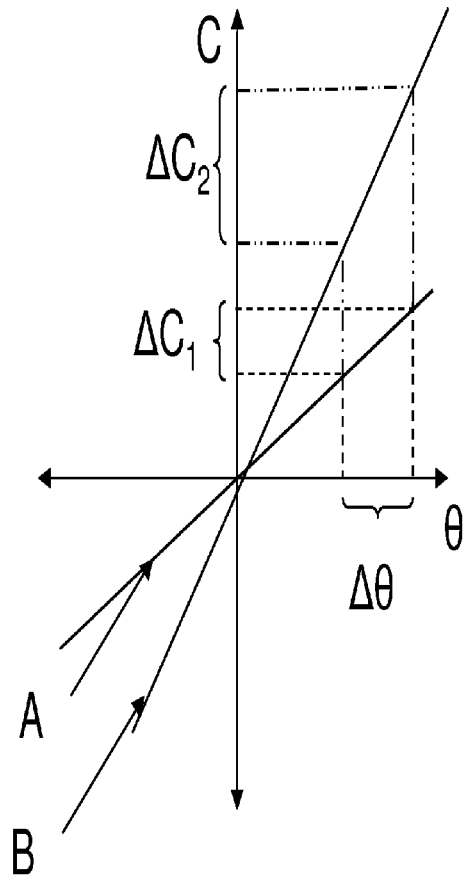
*Fig. 5*
(PRIOR ART)
*Fig. 9*

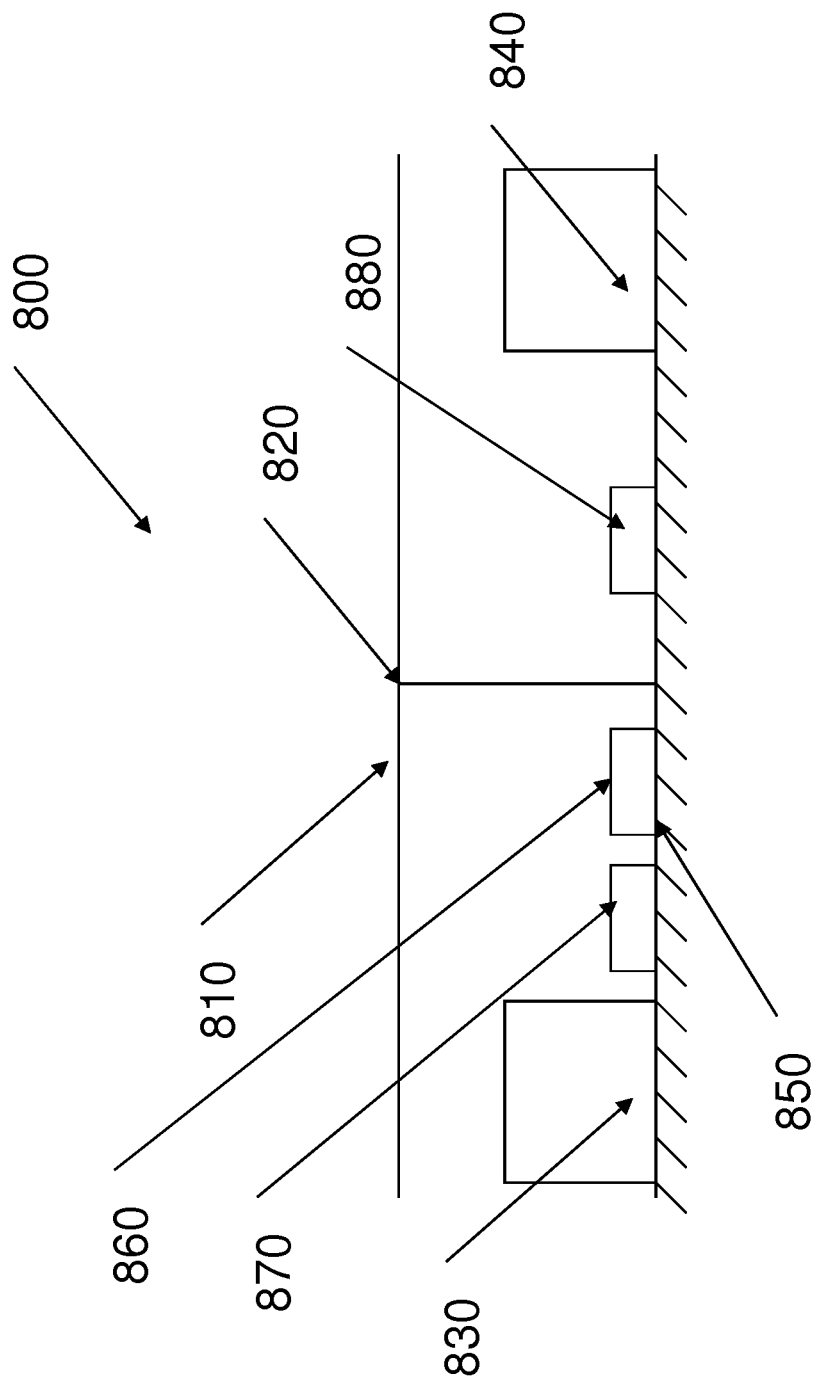

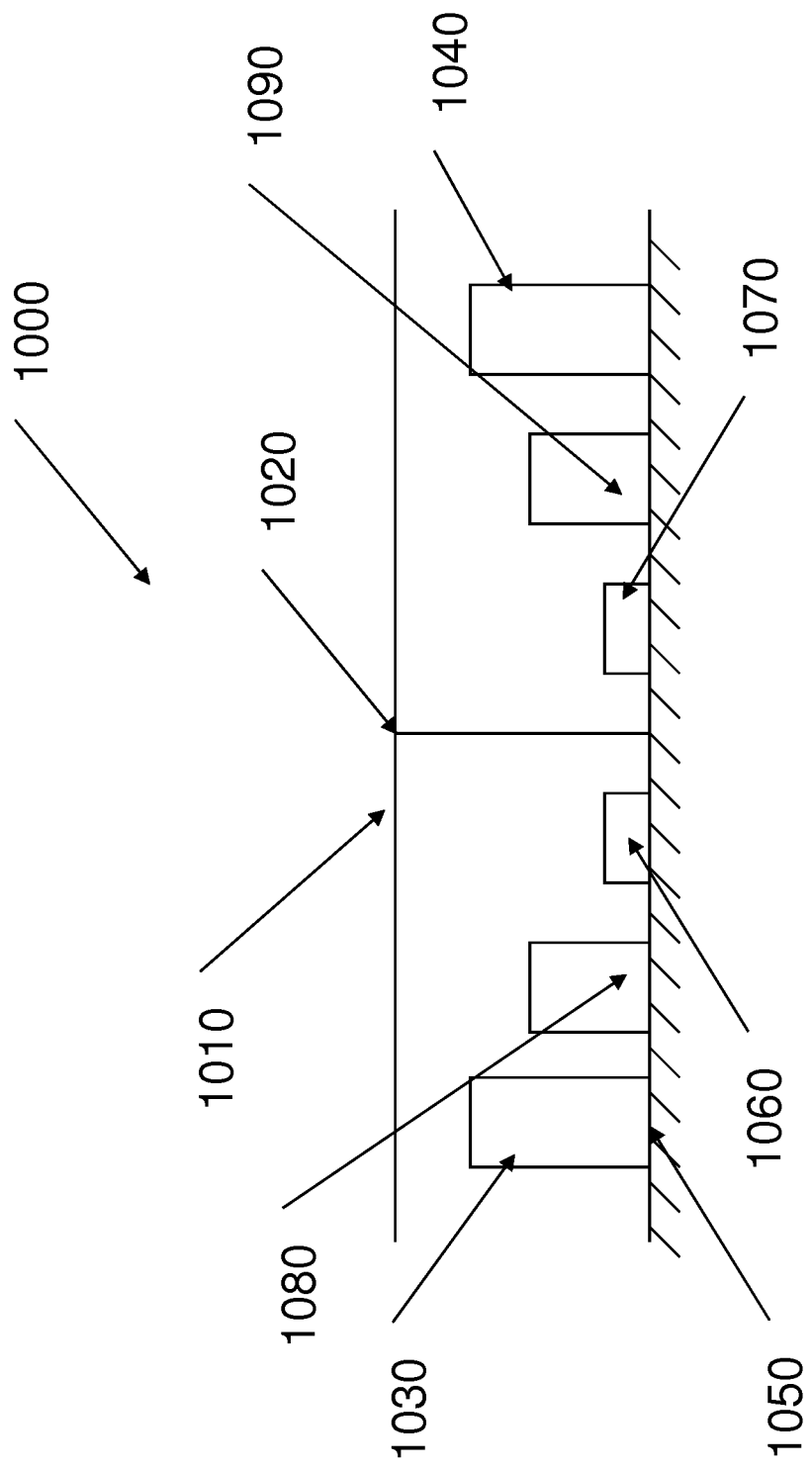

US 9,217,861 B2

MICRO-MIRROR ARRAYS

FIELD OF THE INVENTION

The present invention relates to improvements in or relating to micro-mirror array devices, and is more particularly, although not exclusively, concerned with sectioned micro-mirror arrays for use as a variable focal length lens.

BACKGROUND TO THE INVENTION

Micro-mirror array devices are devices comprise a plurality of microscopically small mirrors arranged in an array. Such devices comprise micro-electromechanical systems (MEMS) devices whose states are controlled by a voltage between electrodes located around the array.

Micro-mirror array devices are operated to tilt along a certain axis (or axes) in order to deflect incident light. Typically, the tilt of the micro-mirror is controlled by the actuation of electrodes associated with the micro-mirror, for example, by using an applied voltage.

Characterisation of voltage against tilt angle for a given micro-mirror device is important in evaluating its performance. Furthermore, this relationship of voltage against tilt angle is also important in calibrating a micro-mirror for use in a certain application, for example, in "smart" lenses where micro-mirrors are used with variable focal length lenses and/or zoom lenses. In addition, obtaining or characterising the voltage-tilt angle relationship at run-time is often desirable to support run-time calibration.

US-A-2008/0137173 discloses a discretely controlled micro-mirror array device including a plurality of micro-mirrors in the form a micro-mirror array and a substrate including control circuitry. Each micro-mirror comprises a structure having a reflective surface with a plurality of segmented electrodes arranged on the substrate, the segmented electrodes being arranged to be evenly distributed or unevenly distributed with respect to their associated micro-mirror. Each micro-mirror is capable of both rotational and translational movement with multiple degrees of freedom. The activation of the segmented electrodes attracts different portions of the micro-mirror structure to provide a desired surface profile.

However, by segmenting the electrodes and therefore increasing the number of electrodes to control each micro-mirror, more complex electronic circuits are required to actuate and control each of the micro-mirror elements to provide the desired surface profile.

WO-A-2009/032347 describes a micro-mirror array device comprising a plurality of micro-mirror array elements. Electrodes associated with the micro-mirror elements are shaped to act as stoppers to limit the movement of the micro-mirror elements when actuated by an applied voltage.

By using the electrodes as stoppers, charge build-up becomes a problem during operation of the micro-mirror.

In current micro-mirror array devices, all the micro-mirror elements in the array are typically identical, with the one micro-mirror element being optimised and then replicated throughout the entire array. Micro-mirror array devices designed this way have the disadvantage that the accuracy of tilt angle required for some implementations is quite high and a complicated and precise manufacturing process is needed to achieve the desired high resolution.

In addition, although each micro-mirror element is designed to be symmetrical about its pivot point or tilt axis, in many applications, the micro-mirror element has asymmetrical performance about its pivot point or tilt axis. This asymmetry cannot be adjusted when each micro-mirror element is designed to be the same.

Moreover, in many implementations of micro-mirror arrays, the electrodes are used for actuation and measurement, and as described above, in some cases, as stoppers to limit the range of movement of each micro-mirror element.

SUMMARY OF THE INVENTION

It is therefore an object of the present invention to provide an improved micro-mirror array device configured as a variable focal length lens which has regions of different properties.

In accordance with one aspect of the present invention, there is provided a variable focal length lens comprising a micro-mirror array having a plurality of micro-mirror elements arranged in at least two sections, each section having at least one property that is different to that of at least one other section, each micro-mirror element having a tilt axis and at least one actuation electrode arranged on each side of the tilt axis; characterised in that each micro-mirror element further comprises at least one measurement electrode arranged on each side of the tilt axis and at least one stopper arranged on each side of the tilt axis, said at least one different property of said one section comprising a first tilt angle range and said different property of said at least one other section comprising another tilt angle range.

By having more than one section in the array, each section can be optimised for its particular function. In particular, the tilt angle can be more accurately controlled to provide a lens of high resolution.

The first tilt angle range may be defined by stoppers having a first height ($h_1$), with the second tilt angle range being defined by stoppers having a second height ($h_2$) where the first height is greater than the first second height.

By having different stopper heights for different sections of the micro-mirror array, it is possible to optimise each section without increasing the complexity of the electronics required to tilt each micro-mirror element within the array.

In one embodiment, each micro-mirror element within a region has tilt asymmetry about its tilt axis provided by stoppers of different heights on either side of the tilt axis.

Preferably, each stopper has a conductive coating to eliminate drift due to charge build up on each micro-mirror element during operation.

In addition, each micro-mirror element may have sensitivity asymmetry about its tilt axis provided by the separate actuation and measurement electrodes on each side of the tilt axis. Sensitivity asymmetry can be implemented by having actuation electrodes on one side of the tilt axis that are different to the actuation electrodes on the other side of the tilt axis, for example, by having electrodes that are of different size and/or shape or a different number of electrodes.

In one embodiment, each micro-mirror element may further comprise at least two measurement electrodes, one measurement electrode being located on one side of the tilt axis and another measurement electrode being located on the other side of the tilt axis.

By separating the actuation and measurement electrodes, each electrode can be optimised for its particular function and there is no need to have a single electrode which is a compromise to allow for both actuation and measurement.

In a particular embodiment, the plurality of micro-mirror elements is arranged as a polar grid, the polar grid being divided into at least an inner region and an outer region, the micro-mirror elements of the inner region having a tilt angle that is less than the tilt angle of the micro-mirror elements in the outer region. The polar grid may comprise a plurality of regions extending outwards from an innermost region to an outermost region, each region comprising a plurality of micro-mirror elements having different tilt characteristics to micro-mirror elements in adjacent regions, the innermost regions having the lowest tilt angles and the outermost region having the greatest tilt angles.

BRIEF DESCRIPTION OF THE DRAWINGS

For a better understanding of the present invention, reference will now be made, by way of example only, to the accompanying drawings in which:—

FIG. 5 illustrates a graph of capacitance against tilt angle for the device of FIGS. 2 to 4;

FIG. 9 illustrates a graph of capacitance against tilt angle for the device of FIGS. 6 to 8;

FIG. 14 illustrates a voltage-tilt angle characteristic for the micro-mirror element shown in FIG. 13;

FIG. 15 is similar to FIGS. 10 and 11 but illustrates a micro-mirror element having a different number of electrodes on either side of the pivot point or tilt axis;

FIG. 19 is similar to FIGS. 10 and 11 but illustrates a micro-mirror element having separate measurement electrodes;

DESCRIPTION OF THE INVENTION

Figure 1:
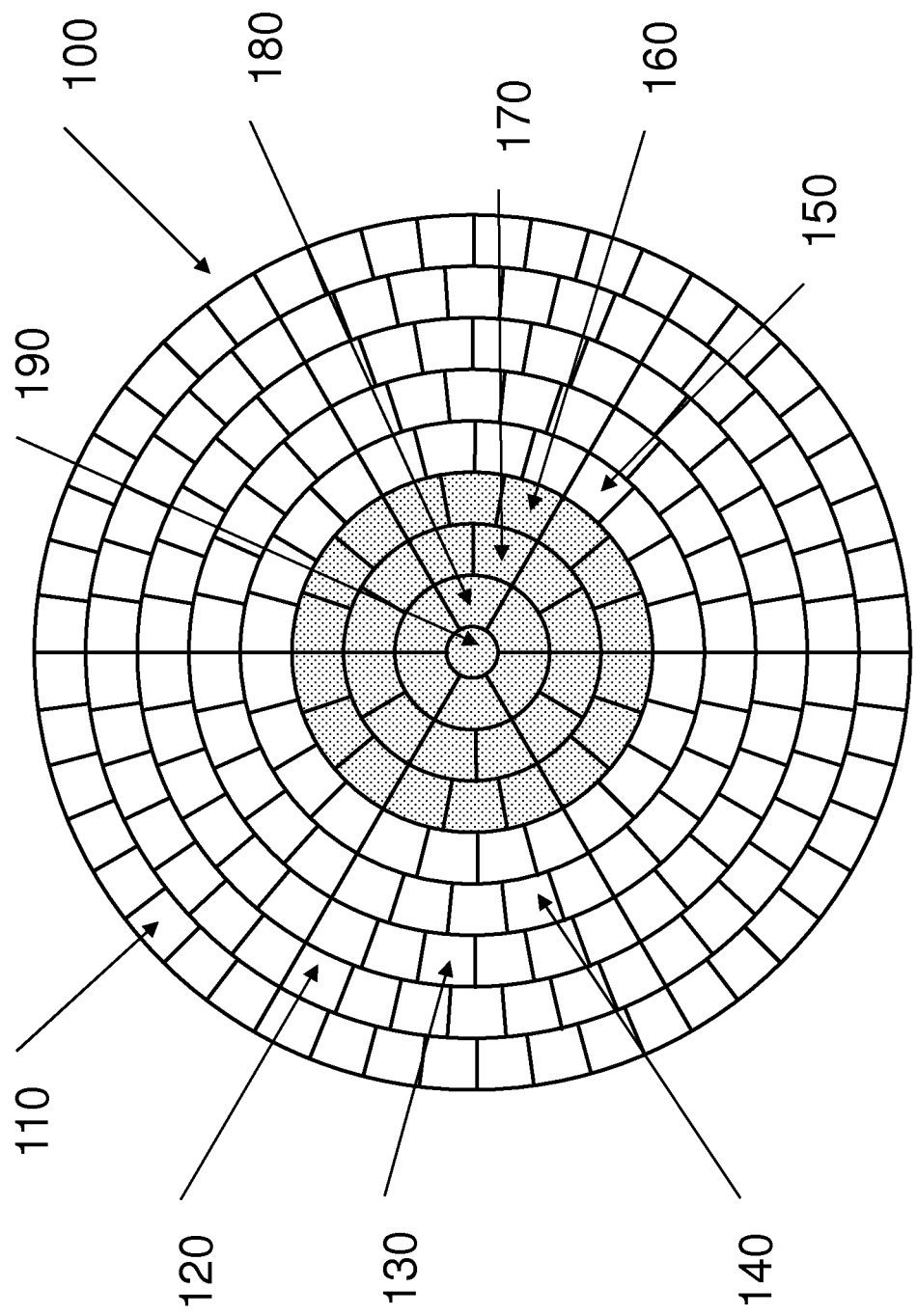
FIG. 1 illustrates a variable focal length lens in accordance with the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

It will be understood that the terms "vertical" and "horizontal" are used herein refer to particular orientations of the Figures and these terms are not limitations to the specific embodiments described herein.

The present invention relates to a variable focal length lens comprising a plurality of micro-mirror elements, each micro-mirror element being optimised for its particular performance. By decoupling the functionality of actuation, measurement and tilt angle, it is possible to obtain a more linear performance for each micro-mirror element in the array forming the variable length focal length lens.

FIG. 1 illustrates a plan view of a polar grid micro-mirror array 100 that can be configured for use as a variable focal length lens. The micro-array 100 comprises a plurality of micro-mirror elements arranged in eight concentric rings 110, 120, 130, 140, 150, 160, 170, 180 arranged around a central micro-mirror element 190. In this array, each ring 110, 120, 130, 140, 150, 160, 170, 180 comprises a different number micro-mirror elements as shown and the illustrated array 100 comprises one hundred and nine micro-mirror elements.

However, it will be appreciated that the array may comprise any suitable number of micro-mirror elements arranged in a regular or irregular pattern within the array. In addition, the array is not limited to a polar grid array. Moreover, groups of elements within the array can operate as individual sections, the elements within each section having substantially the same properties. The properties of each section may be the same or different to other sections within the array.

In accordance with the present invention, the array 100 is divided into two sections, an outer section and an inner section as indicated by the shading. The outer section comprises rings 110, 120, 130, 140, 150 and the inner section comprises rings 160, 170, 180 together with the central micro-mirror element 190. The maximum tilt angle of each section is different and is controlled by different stopper heights as described in more detail below with reference to FIGS. 10 and 11 below.

It has been found that, for a given focal length, the tilt angle required depends on the location of the micro-mirror element within the micro-mirror array. In the particular embodiment described above with reference to FIG. 1, this is a radius and the tilt angles of micro-mirror elements at different radii is different. Hence, the total range of tilt angles of micro-mirror elements at a particular radius is the same and different at different radii.

It has been noted that stopper heights are important for obtaining the desired reference tilt angles for a particular operating tilt range. As described above, the micro-mirror elements are grouped so that a range of radii form a section of the micro-mirror array, that is, from the centre to a first radius, $r_1$, for a first section, and from the first radius, $r_1$, to a second radius, $r_2$, for a second section. In this embodiment, $r_1 < r_2$ and $r_2$ is the maximum radius of the polar grid array 100.

A conventional micro-mirror device and its operation will be first described with reference to FIGS. 2 to 5.

Figure 2:
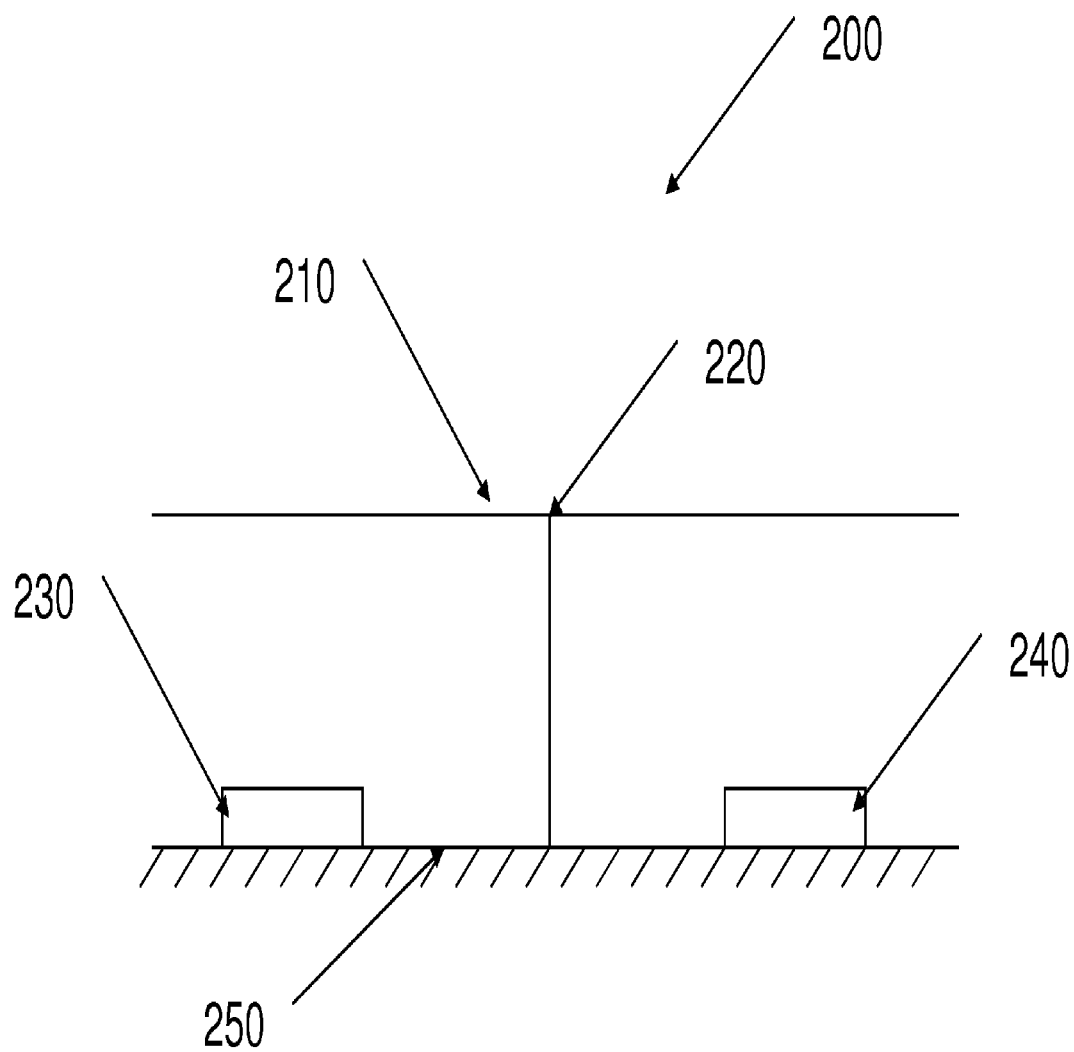
FIG. 2 is a schematic illustration of a conventional micro-mirror device in a neutral position.

In FIG. 2, a conventional micro-mirror device 200 is shown. The device 200 comprises a micro-mirror element 210 which is mounted at a pivot point or tilt axis 220 about which it can tilt in accordance with applied voltage. Two electrode elements 230, 240 are provided which are mounted on a support 250 and are equally spaced from the pivot point or tilt axis 220. Here, the micro-mirror element 210 is shown in a neutral or substantially horizontal position. It will be appreciated, however, that in certain applications, the neutral position may be at an angle to the horizontal.

Figure 3:
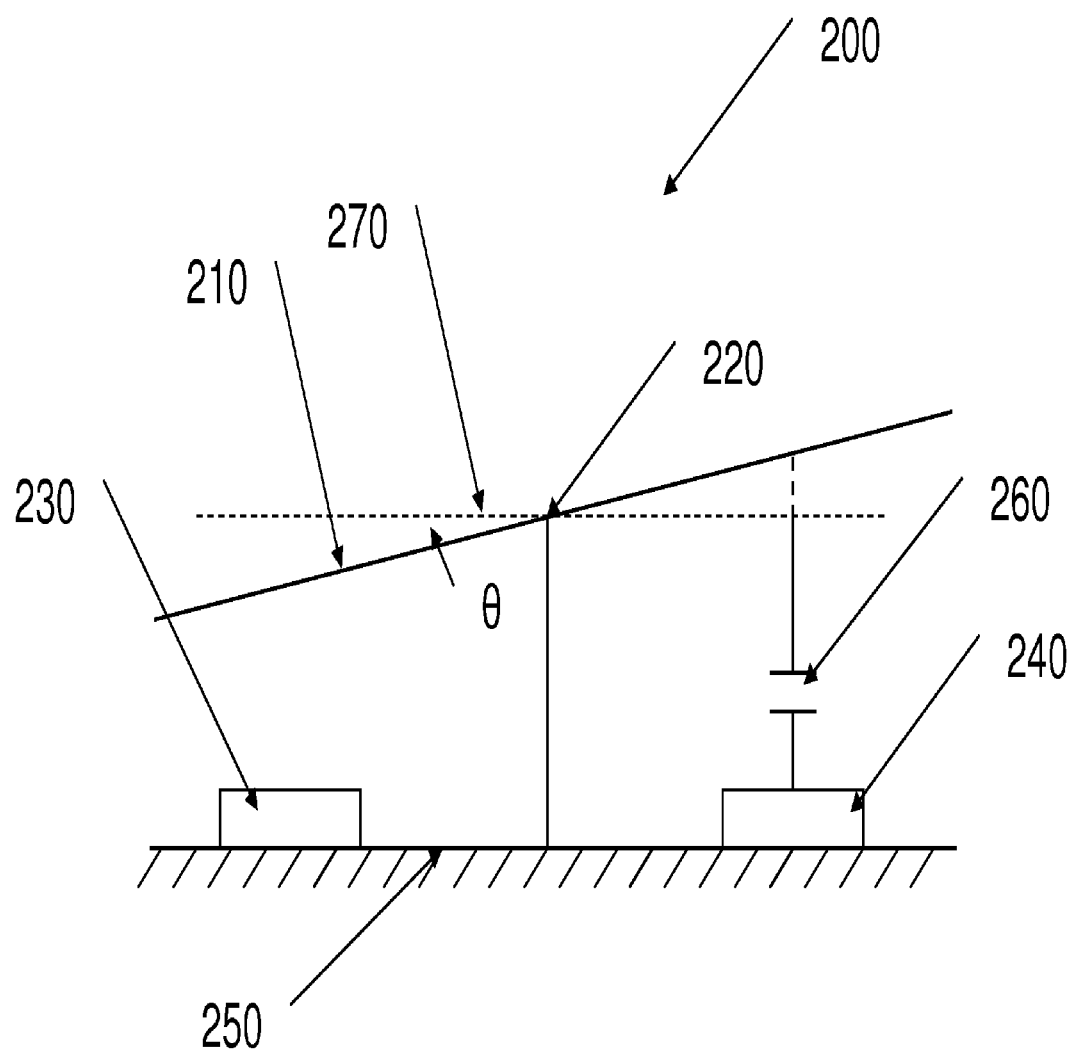
FIGS. 3 and 4 are similar to FIG. 2 but illustrate the micro-mirror device in a first and a second tilt position respectively.

When an actuation voltage is applied to of electrode 230, as shown in FIG. 3, the micro-mirror element 210 tilts about pivot point or tilt axis 220 and a capacitance 260 can be measured at the other electrode 240. This capacitance 260, when compared to the capacitance in the neutral or previous position provides a change in capacitance which corresponds to the tilt angle, θ, when measured from the horizontal as indicated by dotted line 270.

Figure 4:
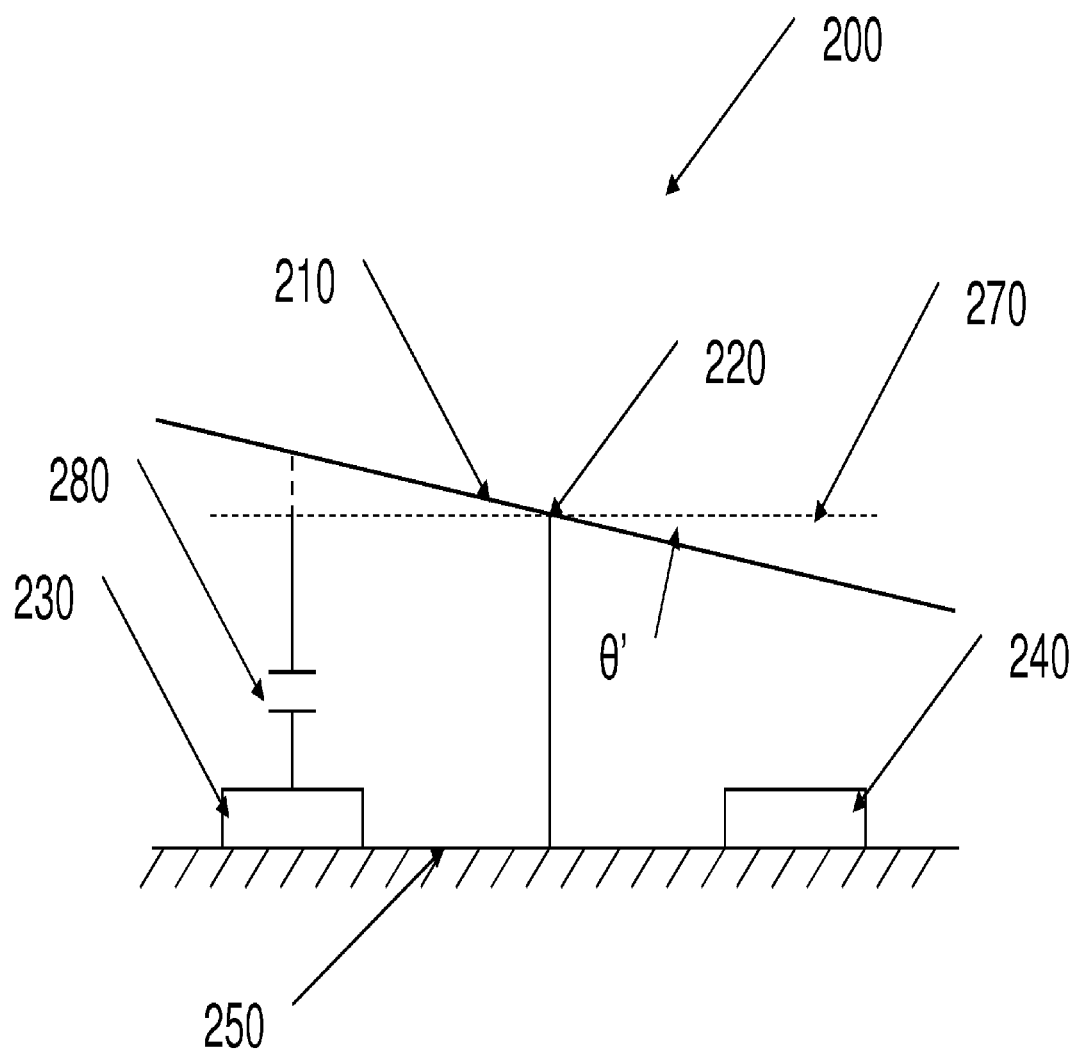

Similarly, in FIG. 4, an actuation voltage applied to the electrode 240 causes the micro-mirror element 210 to tilt about the pivot point or tilt axis 220 and to produce a capacitance 280 that can be measured at the electrode 230 as shown. This capacitance 280, when compared to the capacitance in the neutral or previous position provides a change in capacitance which corresponds to the tilt angle, θ', when measured from the horizontal as indicated by dotted line 270.

In FIGS. 3 and 4, the horizontal as indicated by dotted line 270 is considered to be the neutral position, but it will be appreciated that any other position can be chosen as the neutral position. In addition, the tilt angle can be measured from a previous position of the micro-mirror element 210 which is not horizontal.

It will be appreciated that the value of the tilt angle θ' may be the same as, or different from, the value of the tilt angle θ. By measuring the change in capacitance in each case, the tilt angle of the micro-mirror element 210 due to the actuation voltage can be determined irrespective of which of the two electrodes 230, 240 has the actuation voltage applied to it.

In the micro-mirror device 200 illustrated in FIGS. 2 to 4, the same electrodes 230, 240 are used for both applying the actuation voltage and making the capacitance measurement. This means that the two electrodes 230, 240 are effectively coupled and, in ideal conditions, should be identical to one another.

FIG. 5 illustrates a graph of capacitance, C, against tilt angle, θ, for the micro-mirror device 200 shown in FIGS. 2 to 4. Line A corresponds to the relationship between capacitance and tilt angle for the device 200. By taking two capacitance measurements, a change in capacitance, ΔC, can be obtained and from the position of each of the two capacitance measurements on the line A, a change in tilt angle, Δθ, can be determined as shown. The change in capacitance, ΔC, can be determined from any two suitable capacitance measurements which correspond to particular tilt angles.

For a sensitive micro-mirror device, small changes in tilt angle, Δθ, should provide large changes in capacitance, ΔC. However, the conventional micro-mirror device 200 shown in FIGS. 2 to 4 may not be sufficiently sensitive in some applications.

Sensitivity can be defined as a change in tilt angle for a change voltage actuation or vice versa. For example, for a given change in voltage applied to the an actuation electrode, if the change in tilt angle is large then the device is considered to be sensitive. Similarly, if the change in tilt angle is small for the same change in voltage, then the device is considered to be less sensitive.

If the sensitivity of on one side of the conventional device is to be reduced, due to its symmetrical arrangement with respect to the electrodes, the sensitivity on the other side must be reduced as well. This is due in part to a single electrode being used for both actuation and measurement. In addition, if the sensitivity on one side is reduced, this also has the disadvantage that the drive electronics for one side is over-designed when compared to the drive electronics for the other side.

It is, however, possible to decouple the two sides of the conventional device but this requires separate actuation mechanisms, that is, actuation circuits, which increases the complexity of the electronics. It is therefore not possible to alter readily the sensitivity on one side only of the micro-mirror device without compromising on performance of the electronics.

It will be appreciated that the sensitivity of the device can be adjusted in accordance with the particular implementation requirements. The sensitivity can be adjusted by changing at least one of: the size and the shape, for example, the height of the electrodes; and the number of electrodes on each of the two sides of the pivot point or tilt axis. By changing at least one of the size, the shape or the number of electrodes in the micro-mirror device, different voltage-tilt angle characteristics can be obtained. This is described below with reference to FIGS. 13 to 18.

One way of altering sensitivity is to provide separate actuation and measurement electrodes. By doing so, the electrodes can be optimised for their particular operation, namely, that of being an actuation electrode or of being a measurement electrode.

Figure 6:
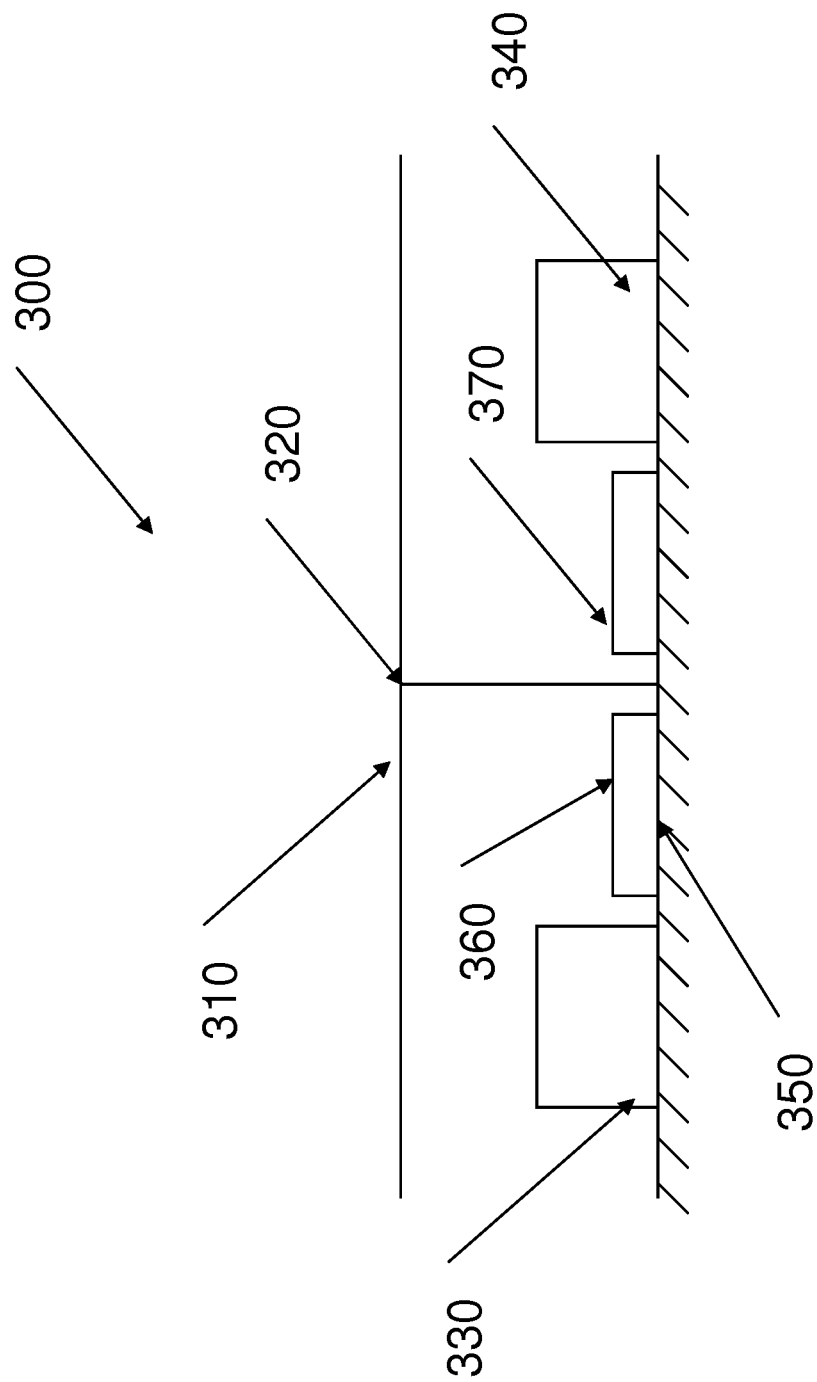
FIG. 6 is a schematic illustration of one configuration of a micro-mirror device.

In FIG. 6, a configuration of a micro-mirror device 300 is shown in which the separate electrodes are used for actuation and measurement. The device 300 comprises a micro-mirror element 310 which is mounted at a pivot point or tilt axis 320 about which it can tilt in accordance with applied voltage. Two measurement electrodes 330, 340 are mounted on a support 350 and are equally spaced from the pivot point or tilt axis 320. Two actuation electrodes 360, 370 are positioned between the measurement electrodes 330, 340 and the pivot point or tilt axis 320.

Naturally, although shown of different sizes, the measurement and actuation electrodes may be of the same size. It is also be appreciated that the measurement electrodes may be located nearer to the pivot point or tilt axis 320 than the actuation electrodes.

In the micro-mirror device 300 shown in FIG. 6, the tilt range on each side of the pivot point or tilt axis 320 is the same, for example, 5°, on each side. A voltage-tilt angle characteristic obtained by activation of one or other of the two actuation electrodes 360, 170 is similar to that shown in FIG. 12. As described above, the voltage-tilt angle characteristic is substantially linear between angles $\theta_{s1}$ and $\theta_{s2}$ and passing through the origin as the maximum tilt angles $\theta_{s1}$ and $\theta_{s2}$ are equal.

Figure 7:
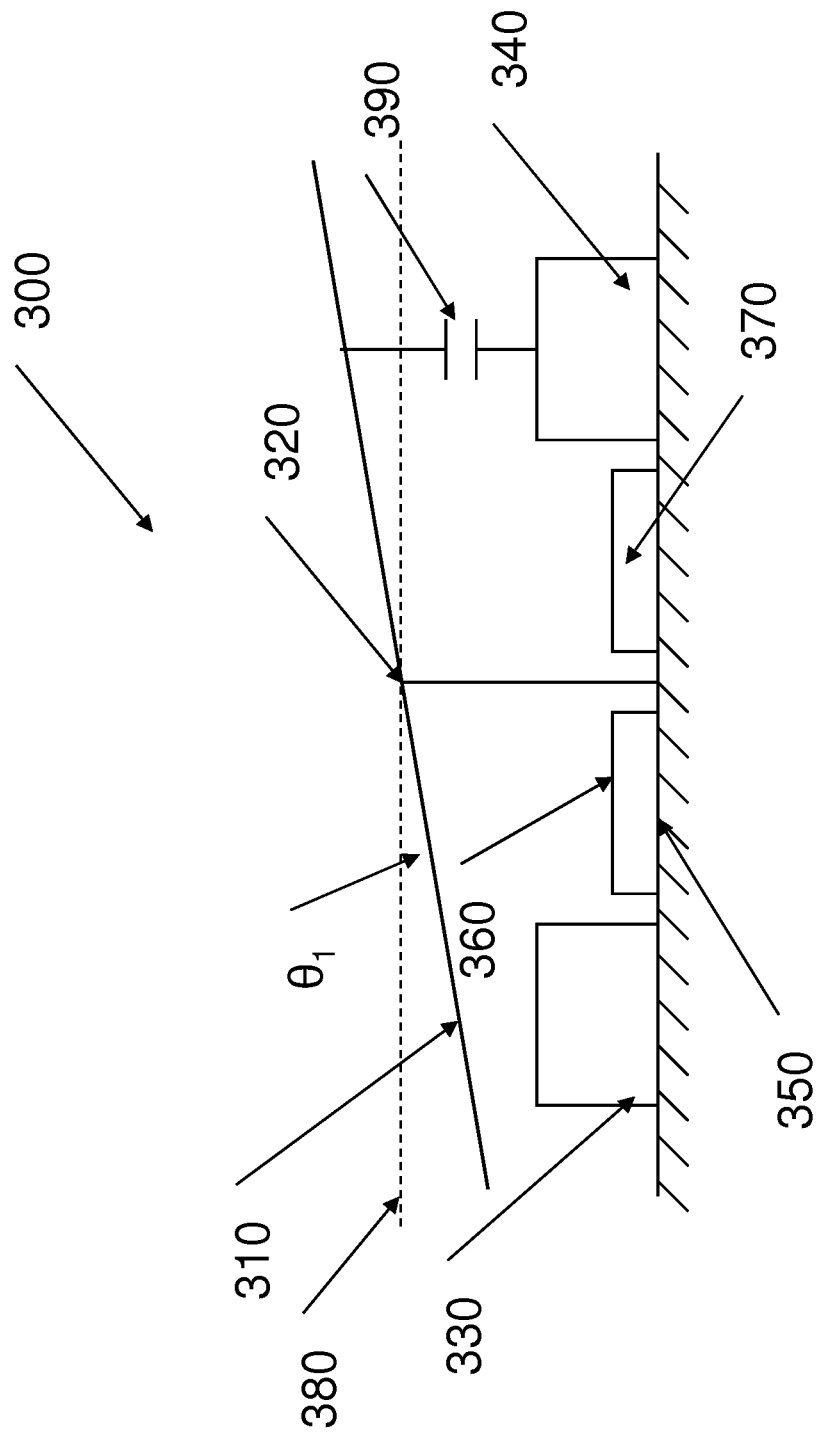
FIGS. 7 and 8 are similar to FIG. 6 but illustrate the micro-mirror device in a first and a second tilt position respectively.
Figure 8:
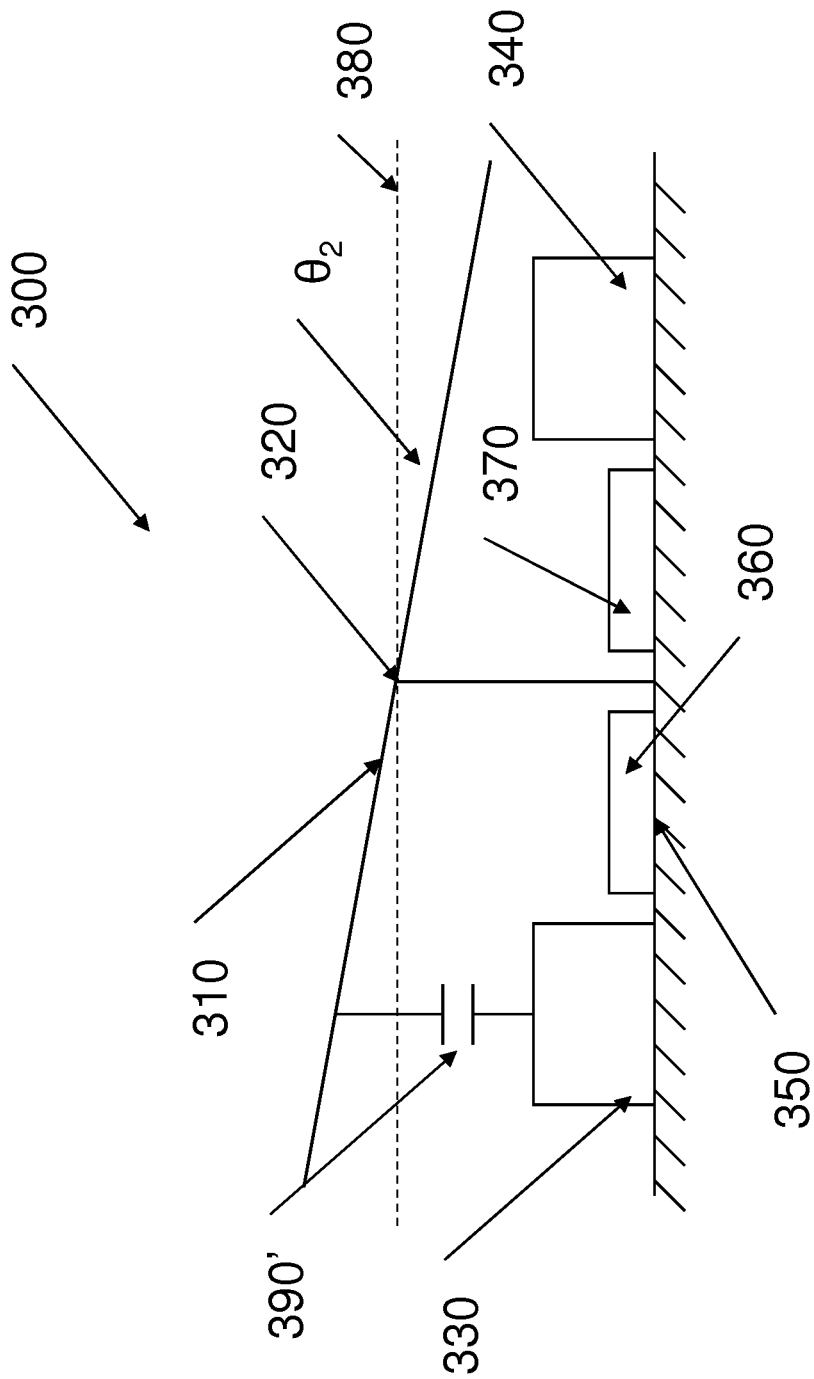

FIGS. 7 and 8 are similar to FIG. 6 but illustrate the application of actuation voltages. When an actuation voltage is applied to actuation electrode 360, as shown in FIG. 7, the micro-mirror element 310 tilts about the pivot point or tilt axis 320 and a capacitance 390 can be measured at the measurement electrode 340. This capacitance 390, when compared to the capacitance in the neutral or previous position provides a change in capacitance which corresponds to the tilt angle, $\theta_1$, when measured from the horizontal as indicated by dotted line 380.

Similarly, in FIG. 8, an actuation voltage applied to actuation electrode 370 causes the micro-mirror element 310 to tilt about the pivot point or tilt axis 320 and to produce a capacitance 390' that can be measured at the measurement electrode 330 as shown. This capacitance 390', when compared to the capacitance in the neutral or previous position provides a change in capacitance which corresponds to the tilt angle, $\theta_2$, when measured from the horizontal as indicated by dotted line 380.

As described above, the horizontal, as indicated by dotted line 380, is considered to be the neutral position, but the neutral position may be any other suitable position in accordance with the particular implementation.

It will be appreciated that the value of the tilt angle $\theta_2$ may be the same as, or different from, the value of the tilt angle $\theta_1$ depending on whether the micro-mirror device supports symmetrical or asymmetrical tilt angles as described in more detail below. By measuring the change in capacitance in each case, the tilt angle of the micro-mirror element 310 due to an actuation voltage applied to one of the electrodes 360, 370 can be determined by capacitance measurements taken at the measurement electrodes 330, 340.

For actuation voltages applied to either one of the electrodes 360, 370, the corresponding capacitance measurement is determined by either one of the measurement electrodes 330, 340. In comparison with the conventional micro-mirror device 200 described with reference to FIGS. 2 to 4 above, the distance between the measurement electrode 330, 340 and the horizontal position of the micro-mirror element 310 is reduced. Whilst this can increase the non-linearity of the capacitance measurement, an increase in the absolute value of the capacitance is also increased.

FIG. 9 illustrates a graph showing the relationship between capacitance, C, and the tilt angle, $\theta$, for both the micro-mirror device 200 of FIGS. 2 to 4 and the micro-mirror device 300 of FIGS. 6 to 8 where the measurement and actuation electrodes are separate electrodes. Line A corresponds to the relationship shown in FIG. 5 for the micro-mirror device 200 and line B corresponds to the relationship for the micro-mirror device 300 where the measurement and actuation electrodes are separate electrodes. Due to the decoupling of the actuation electrodes 360, 370 and the measurement electrodes 330, 340, different relationships are obtained which provides a greater change in capacitance, $\Delta C_2$, for the change in tilt angle, $\Delta\theta$. In this case, $\Delta C_2$ is greater than $\Delta C_1$, which is the capacitance change obtained for the conventional micro-mirror device 200.

Although FIGS. 6 to 8 illustrate a micro-mirror arrangement having two actuation and two measurement electrodes arranged equidistant about a single pivot point or tilt axis, it will be appreciated that any suitable number of actuation and measurement electrodes and associated pivot points or tilt axes can be provided. It is essential, however, that each actuation electrode is decoupled from each measurement electrode.

Figure 10:
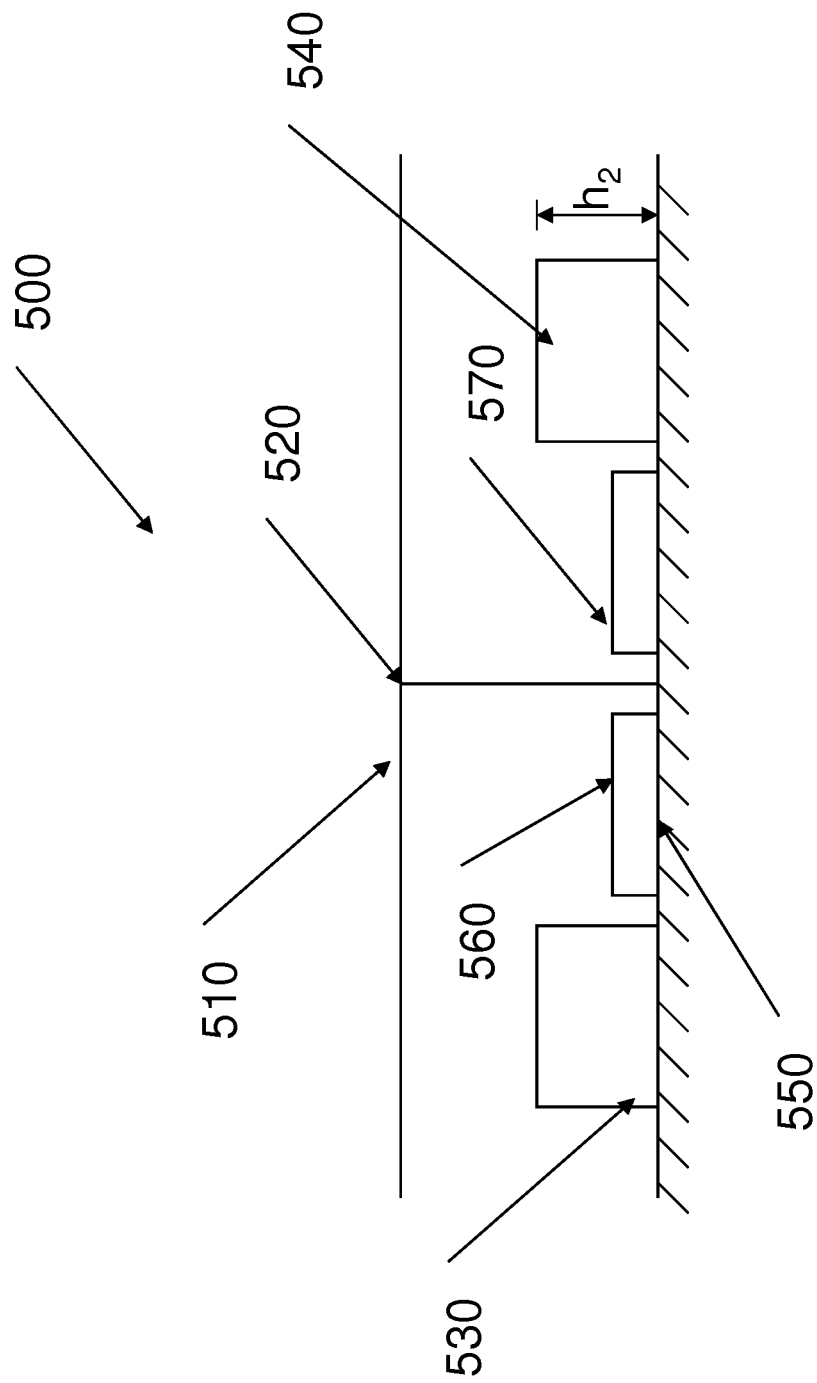
FIG. 10 is a schematic illustration of a micro-mirror element used in one region of the device of FIG. 1.

Referring now to FIG. 10, a micro-mirror element arrangement 500 is shown that can be used for micro-mirror elements in the second or outer section of the polar grid array 100 as described above with reference to FIG. 1. The arrangement 500 comprises a micro-mirror element 510 which is mounted at a pivot point or tilt axis 520 about which it can tilt in accordance with applied voltage. Two stoppers 530, 540 are provided which are mounted on a support 550 and are equally spaced from the pivot point or tilt axis 520. Two actuation electrodes 560, 570 are also provided on the support 550 adjacent respective ones of the stoppers 530, 540. Each stopper 530, 540 has a height $h_2$. Here, the micro-mirror element 510 is shown in a neutral or substantially horizontal position. As described above, other neutral positions are also possible in accordance with a particular implementation.

Figure 11:
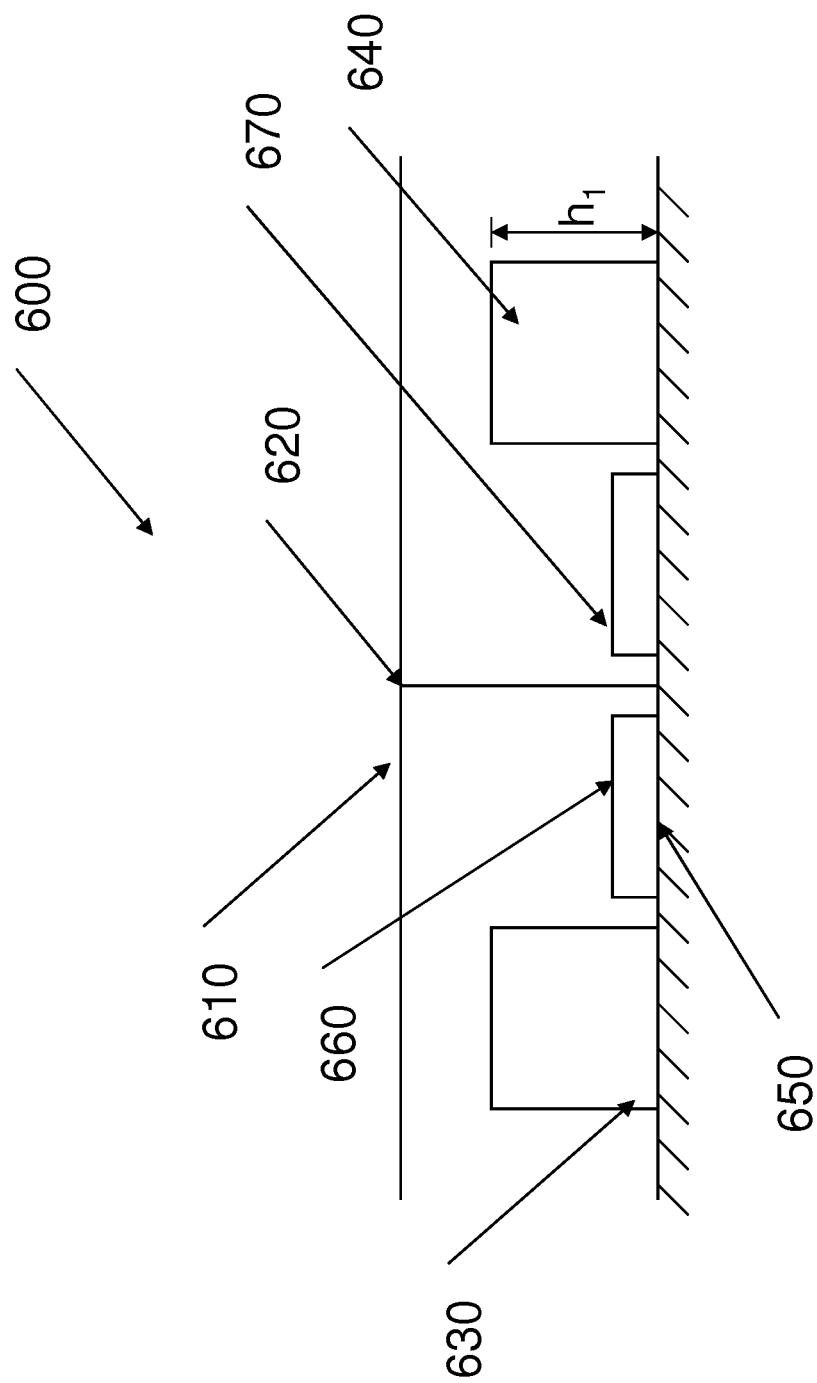
FIG. 11 is similar to FIG. 10 for another region of the device of FIG. 1.

FIG. 11 is similar to FIG. 10 and shows a micro-mirror element arrangement 600 that can be used for micro-mirror elements in the first or inner section of the polar grid array 100 as described above with reference to FIG. 1. The arrangement 600 comprises a micro-mirror element 610 which is mounted at a pivot point or tilt axis 620 about which it can tilt in accordance with applied voltage. Two stoppers 630, 640 are provided which are mounted on a support 650 and are equally spaced from the pivot point or tilt axis 620. Two actuation electrodes 660, 670 are also provided on the support 650 adjacent respective ones of the stoppers 630, 640. Each stopper 630, 640 has a height $h_1$. Again, the micro-mirror element 610 is shown in a neutral or substantially horizontal position.

Figure 12:
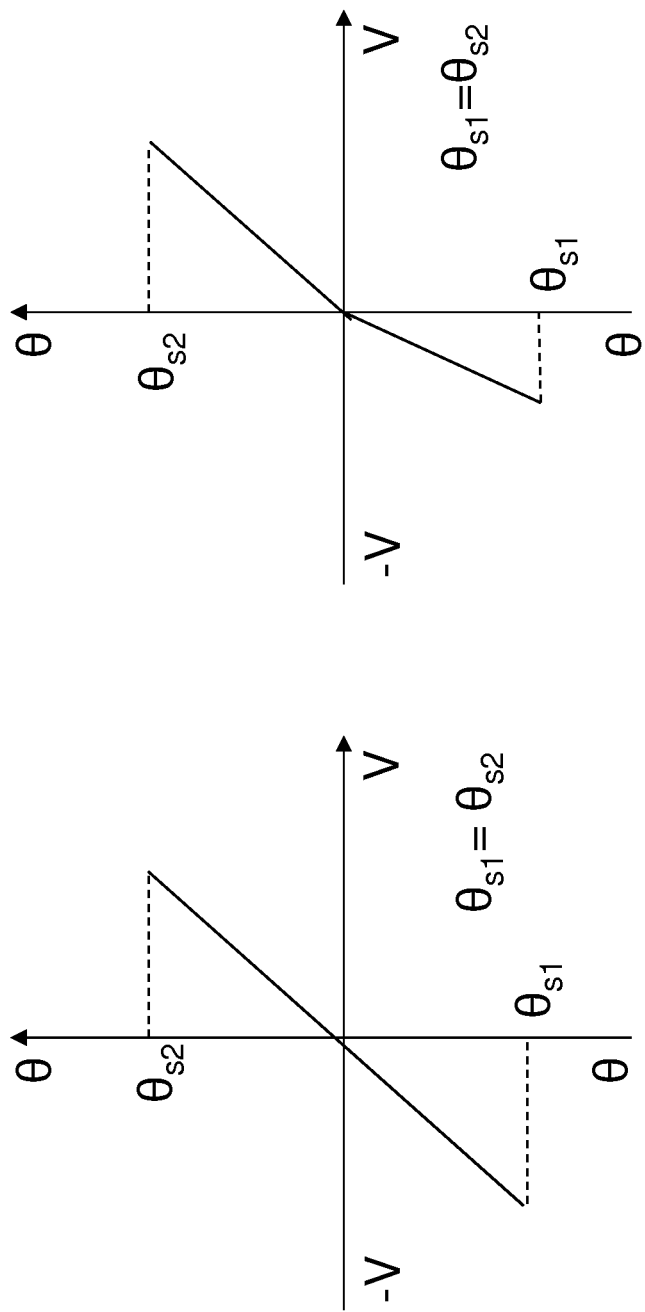
FIG. 12 illustrates a voltage-tilt angle characteristic for the micro-mirror elements shown in FIGS. 10 and 11.

As above, the stopper heights $h_1$, $h_2$ are the same for respective stoppers 530, 540, 630, 640, the voltage-tilt angle characteristic for each arrangement 500, 600 is shown in FIG. 12. In FIG. 12, $\theta_{s1}=\theta_{s2}$ where $\theta_{s1}$ is the tilt angle of stopper 530 in FIG. 10 and stopper 630 in FIG. 11 and $\theta_{s2}$ is the tilt angle of stopper 540 in FIG. 10 and stopper 640 in FIG. 11.

In FIGS. 10 and 11, a single electrode is shown on each side of the pivot point or tilt axis, the single electrode being used for both actuation and measurement. Naturally, such a single electrode may be replaced with separate actuation and measurement electrodes as will be described in more detail below with reference to FIGS. 19 and 20.

The tilt range for the first or inner section is less than the tilt range of the second or outer section, and hence the stopper heights in the first or inner section is greater than the stopper heights in the second or outer section, that is, $h_1 > h_2$.

The advantage of having different tilt ranges in different sections is that more accuracy is provided for the operation of each micro-mirror element within its tilt range. In addition, simplified electronics can be provided, for example, micro-mirror elements in the second or outer section can be powered using low resolution voltage generators as the resolution of the tilt angle is lower than the resolution of the tilt of the first or inner section.

As described above, micro-mirrors usually tilt about one or more pivot points or tilt axes, and the mechanical properties are such that the tilt range is symmetric along the pivot point or tilt axis, for example, 5° on either side of the pivot point or tilt axis. However, in some implementations, the tilt range needs to be asymmetric, for example, in a varifocal lens where different focal length ranges are required in different areas of the lens, for example, 5° on one side of the pivot point or tilt axis and only about 2° on the other side of the pivot point or tilt axis.

Stoppers are used to determine the tilt angle range, and, the stopper height is inversely proportional to the tilt angle. In addition to having different stopper heights for the micro-mirror elements in the inner and outer sections of the polar grid array 100, it is possible for each micro-mirror element in each of the inner and outer sections to have different stopper heights as described below with reference to FIG. 20 below.

Where stopper heights within a single micro-mirror element are different, the sensitivity of the micro-mirror element can be different on one side of the pivot point or tilt axis to the sensitivity on the other side of the pivot point or tilt axis.

In the micro-mirror device 500 shown in FIG. 10, the tilt range on each side of the pivot point or tilt axis 520 is the same, for example, 5°, on each side. A voltage-tilt angle characteristic obtained by activation of one or other of the two actuation electrodes 560, 570 is shown in FIG. 12. In FIG. 12, the voltage-tilt angle characteristic is substantially linear between angles $\theta_{s1}$ and $\theta_{s2}$ and passing through the origin as the maximum tilt angles $\theta_{s1}$ and $\theta_{s2}$ are equal as described above. A similar voltage-tilt angle characteristic is obtained for the micro-mirror device 600 shown in FIG. 11 although the tilt angle is different due to the difference between stopper height $h_1$ of stoppers 530, 540 and stopper height $h_2$ of stoppers 630, 640.

However, in an asymmetric tilt situation, the tilt range on one side of the pivot point or tilt axis is different to the tilt range on the other side of the pivot point or tilt axis. For example, the tilt range may be 5° on one side of the pivot point or tilt axis and, 2° on the other side of the pivot point or tilt axis. If different tilt positions are required of a particular tilt range, for example, eight different tilt positions in the 5° range and sixteen different tilt positions in the 2° range, the sensitivity on each side of the pivot point or tilt axis needs to be adjusted accordingly.

Figure 13:
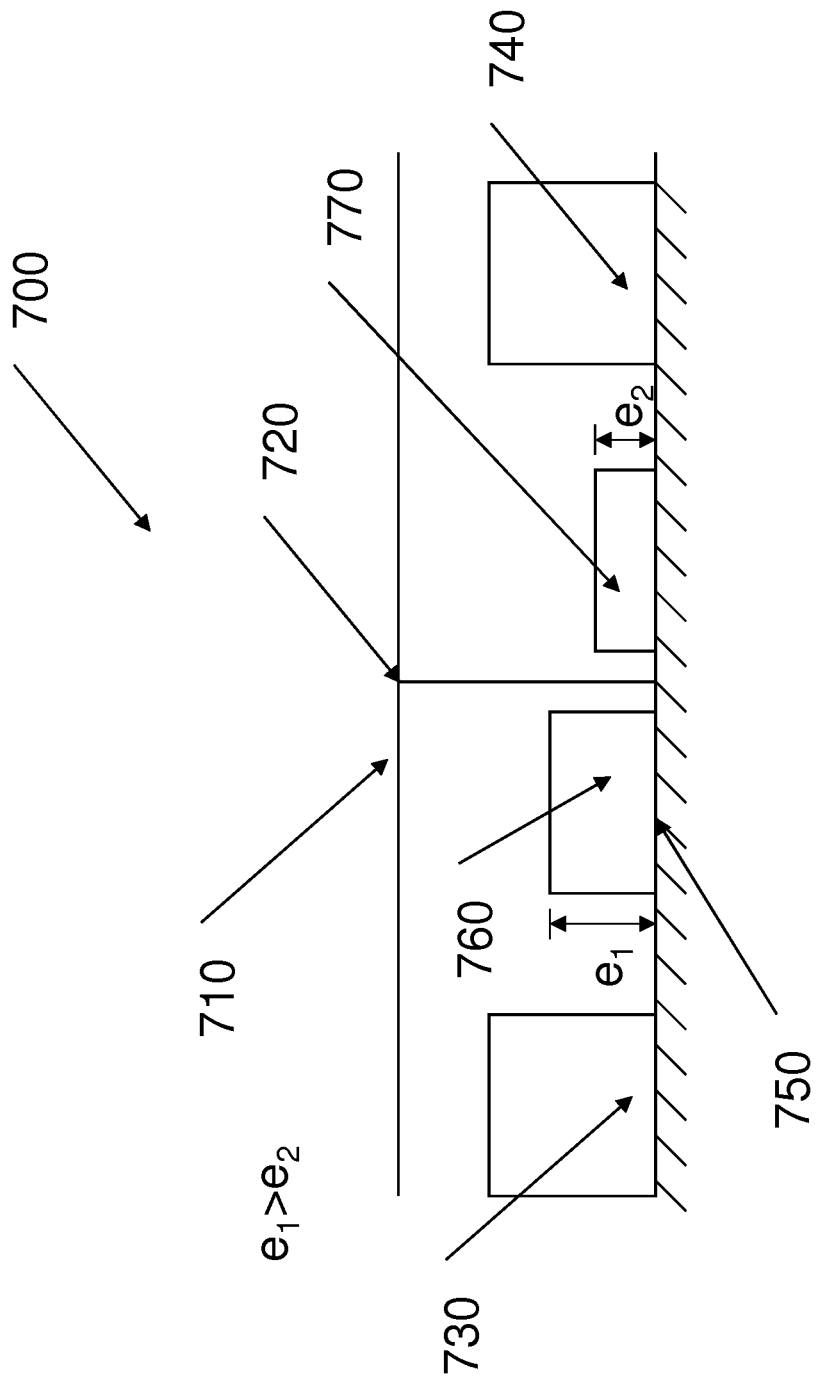
FIG. 13 is similar to FIGS. 10 and 11 but illustrates a micro-mirror element with different electrode heights.
Figure 20:
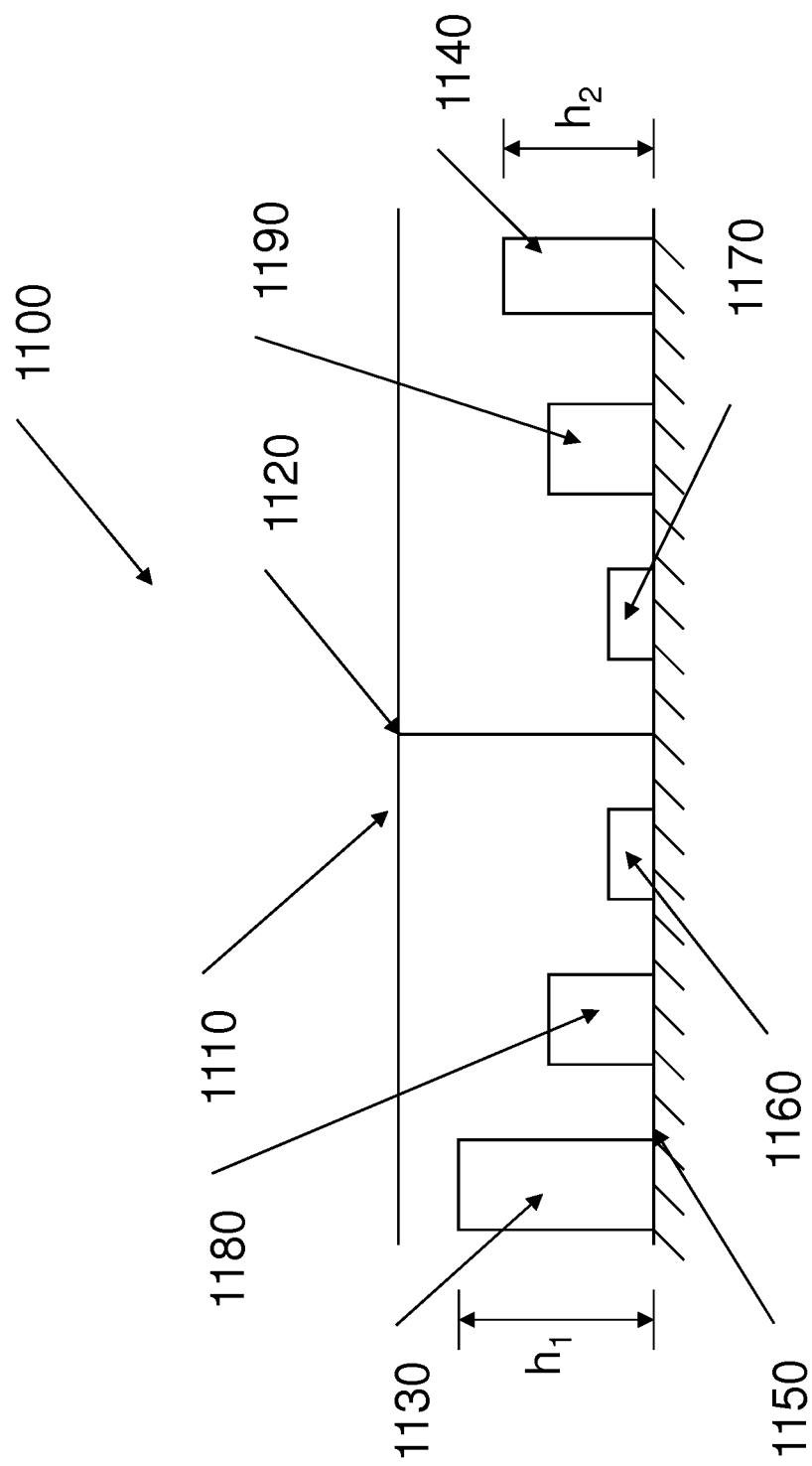
FIG. 20 is similar to FIG. 19 but illustrates a micro-mirror element having different stopper heights.

A micro-mirror device 700 is shown in FIG. 13 in which different electrode heights are utilised. The device 700 comprises a micro-mirror element 710 which is mounted at a pivot point or tilt axis 720 about which it can tilt in accordance with applied voltage. Two stoppers 730, 740 are provided which are mounted on a support 750 and are equally spaced from the pivot point or tilt axis 720. Two actuation electrodes 760, 770 are also provided on the support 750 adjacent respective ones of the stoppers 730, 740. Each actuation electrode 760, 770 is spaced at the same distance from the pivot point or tilt axis 720. In this case, the stoppers 730, 740 are the same and each actuation electrode 760, 770 has the functionality as both an actuation electrode and a measurement electrode. In FIGS. 19 and 20 below, a micro-mirror device will be described in which the actuation and measurement electrodes are separate electrodes.

In FIG. 13, electrode 760 has a height $e_1$ and electrode 770 has a height $e_2$, where $e_1 > e_2$. The different electrode heights can be considered to correspond to different electrode shapes.

FIG. 14 illustrates the voltage-tilt angle characteristic for the embodiment of the micro-mirror device 700 as shown in FIG. 13. The voltage-tilt angle characteristic has a substantially linear profile between the origin and maximum tilt angle $\theta_{s1}$ for electrode 770. Similarly, the voltage-tilt angle characteristic has a substantially linear profile between the origin and maximum tilt angle $\theta_{s2}$ for electrode 760. However, the slope of each part of the profile is different and therefore has different sensitivities. For electrode 770, a small change in voltage provides a large change in tilt angle and for electrode 760, a small change in voltage provides a small change in tilt angle.

In FIG. 15, a micro-mirror device 800 having different sensitivities on either side of the pivot point or tilt axis is shown. Here, the device 800 comprises a micro-mirror element 810 which is mounted at a pivot point or tilt axis 820 about which it can tilt in accordance with applied voltage. Two stoppers 830, 840 are provided which are mounted on a support 850 and are equally spaced from the pivot point or tilt axis 820.

In this embodiment, two actuation electrodes 860, 870 are provided on the support 850 between stopper 830 and the pivot point or tilt axis 820. A single actuation electrode 880 is provided on the support between stopper 840 and the pivot point or tilt axis 820. The three electrodes 860, 870, 880 are of the same shape and size.

As described above, a separate measurement electrode (not shown) may be provided on each side of the pivot point or tilt axis 820.

Figure 16:
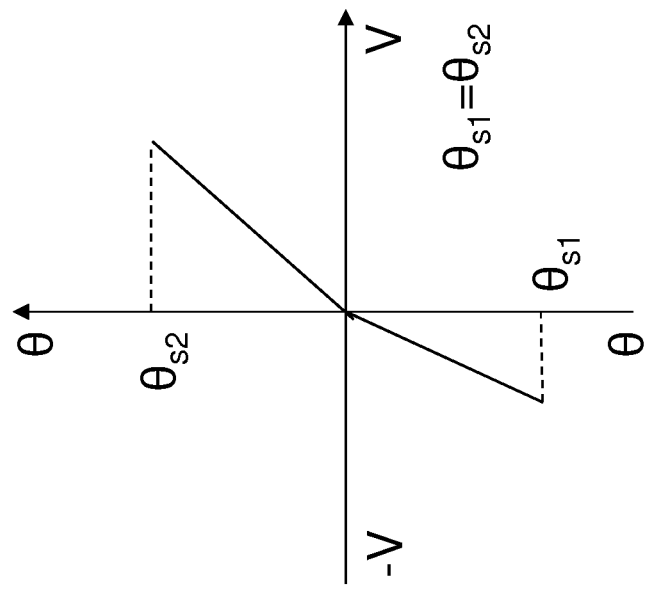
FIG. 16 illustrates a voltage-tilt angle characteristic for the micro-mirror element shown in FIG. 15.
Figure 18:
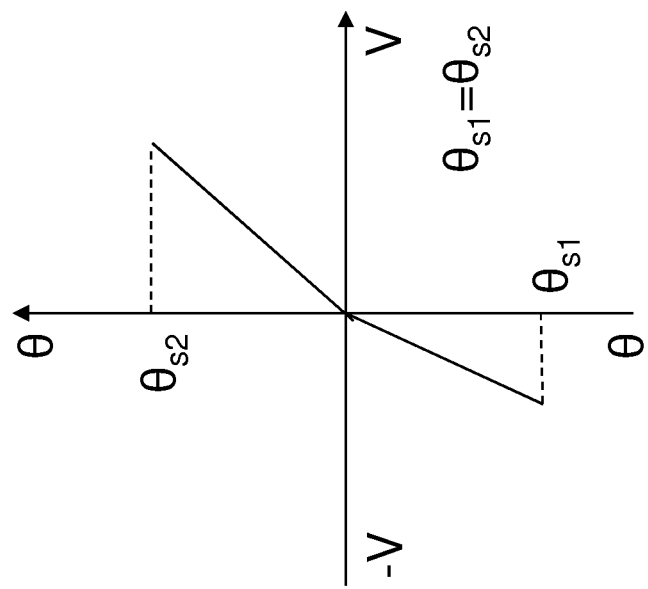
FIG. 18 illustrates a voltage-tilt angle characteristic for the micro-mirror element shown in FIG. 17.

A similar voltage-tilt angle characteristic to that shown in FIG. 14 is obtained for the device 800 as shown in FIG. 16. By increasing the number of actuation electrodes on one side of the pivot point or tilt axis, increased sensitivity can be obtained as the same voltage is applied to each electrode, and any small changes in voltage provide a large change in tilt angle.

Figure 17:
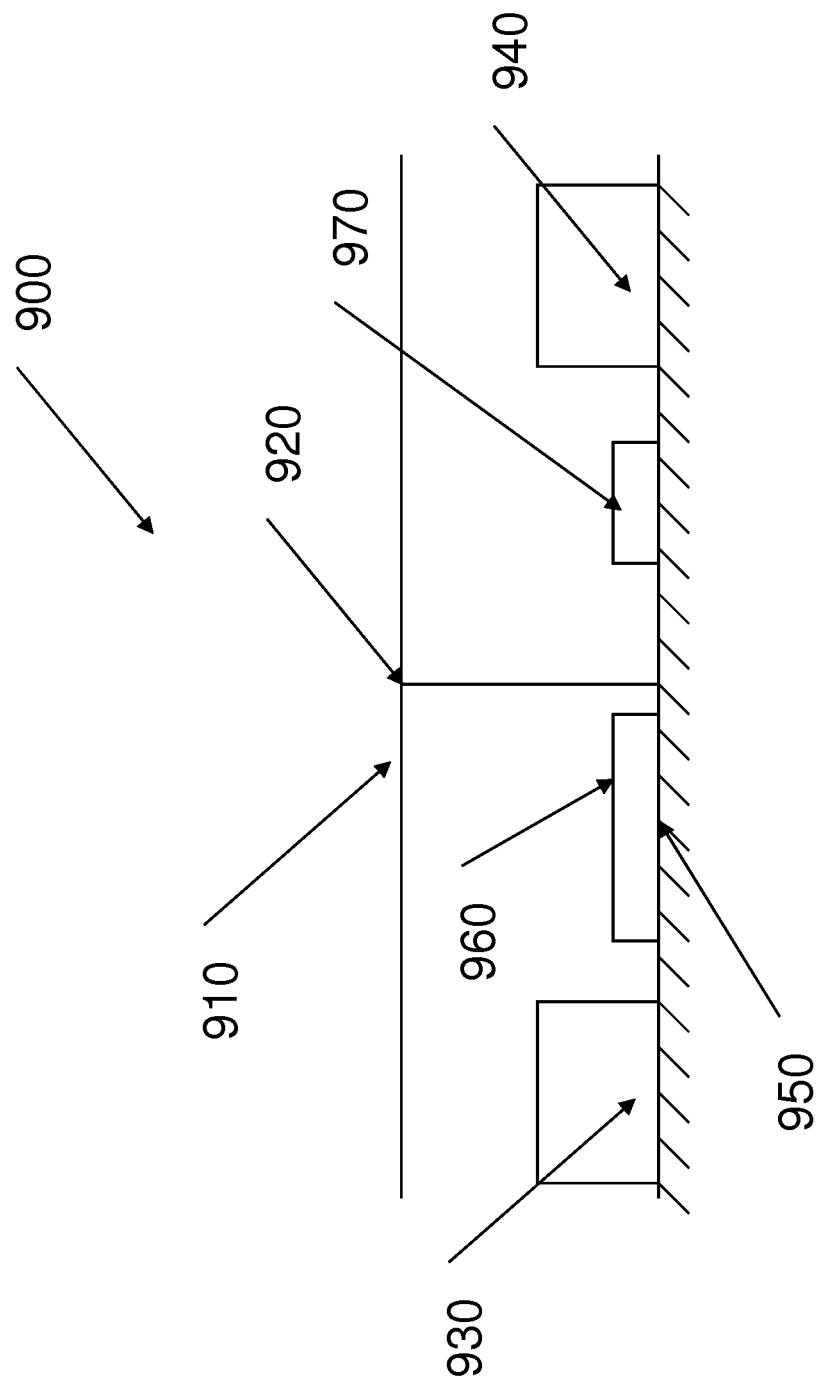
FIG. 17 is similar to FIGS. 10 and 11 but illustrates a micro-mirror element having electrodes of different shapes.

FIG. 17 illustrates another micro-mirror device 900. Here, the device 900 comprises a micro-mirror element 910 which is mounted at a pivot point or tilt axis 920 about which it can tilt in accordance with applied voltage. Two stoppers 930, 940 are provided which are mounted on a support 950 and are equally spaced from the pivot point or tilt axis 920. Two actuation electrodes 960, 970 are also provided on the support 950 adjacent respective ones of the stoppers 930, 940.

In this embodiment, actuation electrode 960 has a different shape and/or size to actuation electrode 970. This difference provides the same effect in the change of sensitivity as shown by the voltage-tilt angle characteristic of FIG. 18. As described previously, a separate measurement electrode (not shown) may be provided on each side of the pivot point or tilt axis 920.

In FIG. 19, a micro-mirror device 1000 is shown for a symmetrical tilt range. The device 1000 comprises a micro-mirror element 1010 which is mounted at a pivot point or tilt axis 1020 about which it can tilt in accordance with applied voltage. Two stoppers 1030, 1040 are provided on a support 1050 and spaced from the pivot point or tilt axis 1020. Between the stoppers 1030, 1040 and the pivot point or tilt axis 1020 are located two actuation electrodes 1060, 1070 and two measurement electrodes 1080, 1090. Here, the micro-mirror element 1010 is shown in a neutral or substantially horizontal position.

Here, actuation electrode 1060 operates to change the tilt angle of the micro-mirror element 1010 and measurement electrode 1090 measures the capacitance induced by the change in the tilt angle. Similarly, when actuation electrode 1070 operates to change the tilt angle of the micro-mirror element 1010, measurement electrode 1080 measures the capacitance induced by the change in the tilt angle.

This means that the actuation and measurement electrodes are decoupled and each electrode can be individually optimised for actuation and measurement respectively. As described above, the size, shape and number of electrodes can be modified to improve the sensitivity.

Although the actuation electrodes are shown in FIG. 19 as being the same, it will be appreciated they may be similar to those described above with reference to FIGS. 13, 15 and 17 if asymmetric sensitivity is required.

Due to the decoupling of the actuation electrodes 1060, 1070 and the measurement electrodes 1080, 1090, different relationships are obtained which provides a greater change in capacitance, $\Delta C_2$, for the change in tilt angle, $\Delta \theta$. In this case, $\Delta C_2$ is greater than $\Delta C_1$, which is the capacitance change obtained for the micro-mirror device 500 of FIG. 10 (or micro-mirror device 600 of FIG. 11). This is similar to that described above with reference to FIG. 9. As before, line A corresponds to the relationship shown in FIG. 5 for the micro-mirror device 500 of FIG. 10 (or micro-mirror device 600 of FIG. 11) and line B corresponds to the relationship for the micro-mirror device 1000.

In addition to providing a greater change in capacitance, $\Delta C_2$, decoupling the functionality of the actuation and measurement electrodes improves the linearity of the relationship so that relative errors are reduced.

As described above with reference to FIG. 12, a voltage-tilt angle characteristic for a micro-mirror element arrangement is shown where the stopper heights are the same and the tilt angle on each side of the pivot point or tilt axis is the same.

FIG. 20 illustrates an embodiment of a micro-mirror element arrangement 1100 which is similar to the micro-mirror element arrangement 1000 shown in FIG. 19. The micro-mirror element arrangement 1100 is shown in a substantially neutral position and comprises a micro-mirror element 1110 which is mounted at a pivot point or tilt axis 1120 about which it can tilt in accordance with applied voltage. Two stoppers 1130, 1140 are provided on a support 1150 and spaced from the pivot point or tilt axis 1120. Between the stoppers 1130, 1140 and the pivot point or tilt axis are located two actuation electrodes 1160, 1170 and two measurement electrodes 1180, 1190.

Figure 21:
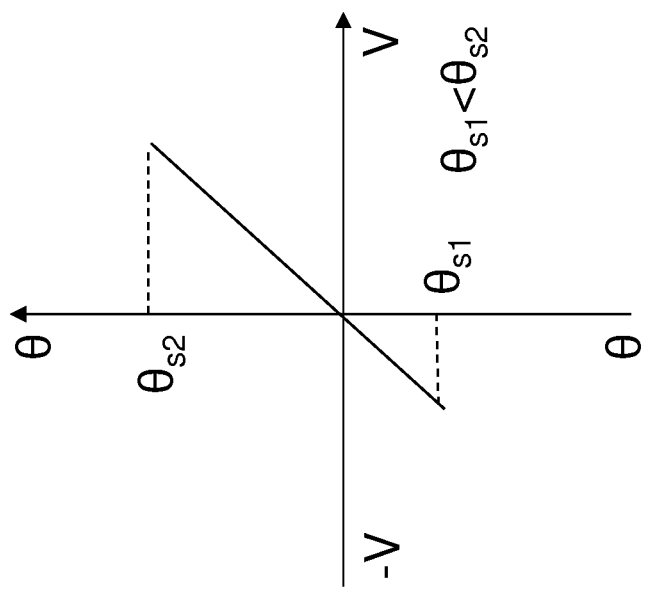
FIG. 21 illustrates a voltage-tilt angle characteristic for the micro-mirror element shown in FIG. 20.

Here, stopper 1130 has a height $h_1$ and stopper 1140 has a height $h_2$ where $h_1 > h_2$. An asymmetric voltage-tilt angle characteristic is obtained as shown in FIG. 21. Here, $\theta_{s1}$ is less than $\theta_{s2}$ due to the limitation of tilt angle provided to the micro-mirror element 1110, for example, $\theta_{s1}$ may be 2° and $\theta_{s2}$ may be 5°.

It will be appreciated that the values of 2° and 5° are given by way of example only and that other values can be chosen in accordance with the particular implementation.

Stoppers 1130, 1140, that is, stoppers having different heights $h_1$, $h_2$ can be used to provide reference tilt angles for calibration of the micro-mirror array devices to provide voltage-tilt angle characteristic for micro-mirror elements within such micro-mirror array devices.

As an alternative to having stoppers of different heights, stoppers of the same height can be used but they are spaced at different distances from their associated pivot point or tilt axis thereby providing a different effective height relative to the micro-mirror element.

Figure 22:
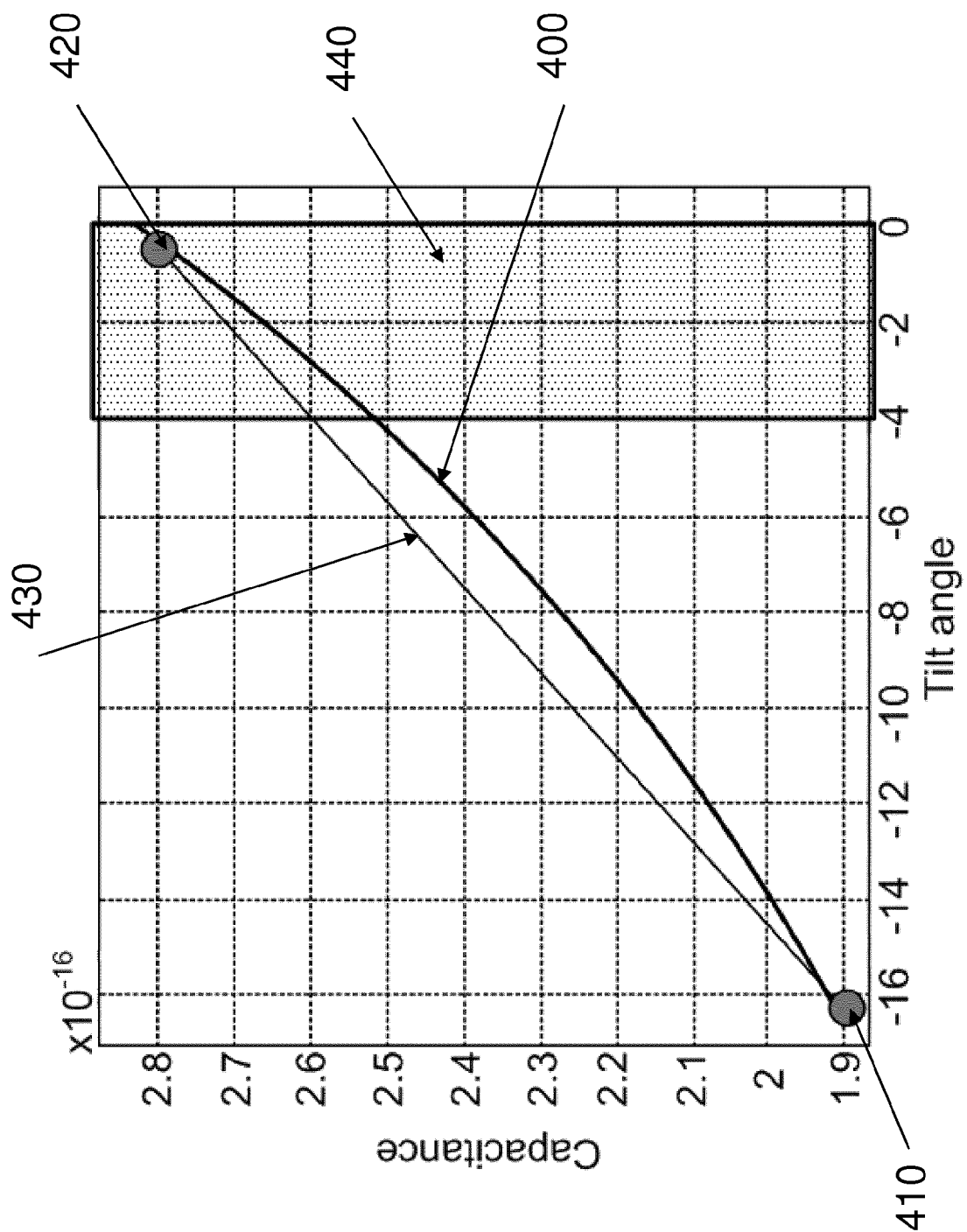
FIG. 22 illustrates a graph of capacitance against tilt angle characteristic for a micro-mirror element.

As described above, the relationship between capacitance and tilt angle is linear. However, in practice, the relationship is not linear if the stopper is not decoupled from the measurement and actuation electrodes. In FIG. 22, a graph of capacitance against tilt angle is shown in which the relationship for an electrode acting as a stopper is indicated by curve 400. For comparison, a linear relationship extending between the lower point 410 and the upper point 420 on the curve 400 is indicated by line 430. In an effective operating area 440, it can be seen that the portion of the curve 400 in that area cannot be considered to be linear when compared to line 430.

Figure 23:
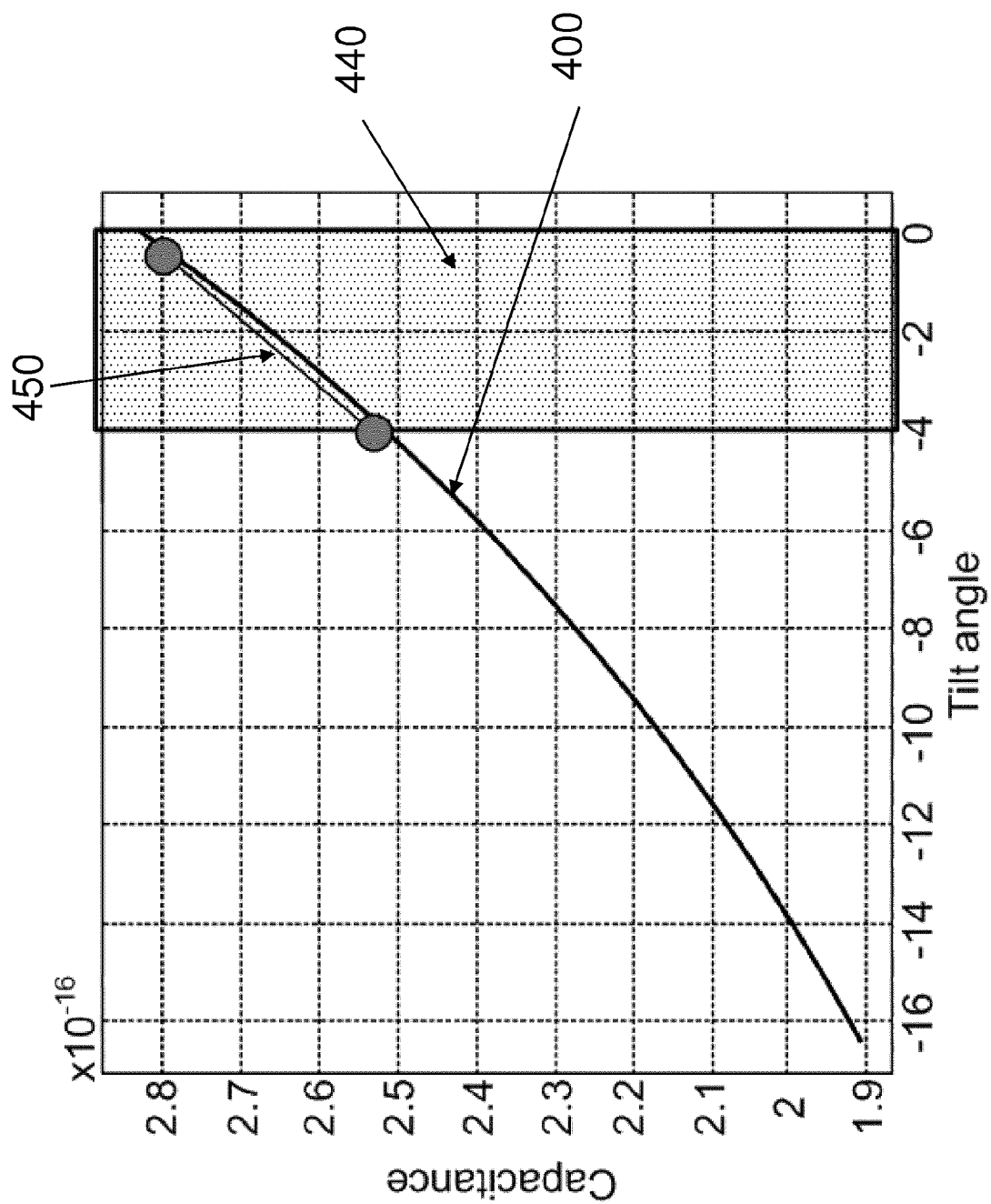
FIG. 23 is similar to FIG. 23 but illustrates the effect of decoupling the functionality of the stoppers from that of the electrodes.

When the stoppers are decoupled from the actuation and measurement electrodes, the situation is improved as shown in FIG. 23. In FIG. 23, the curve 400 is shown but in this case the decoupling of the stoppers enables a substantially linear relationship within the effective operating area 440 as shown by line 450.

Figure 24:
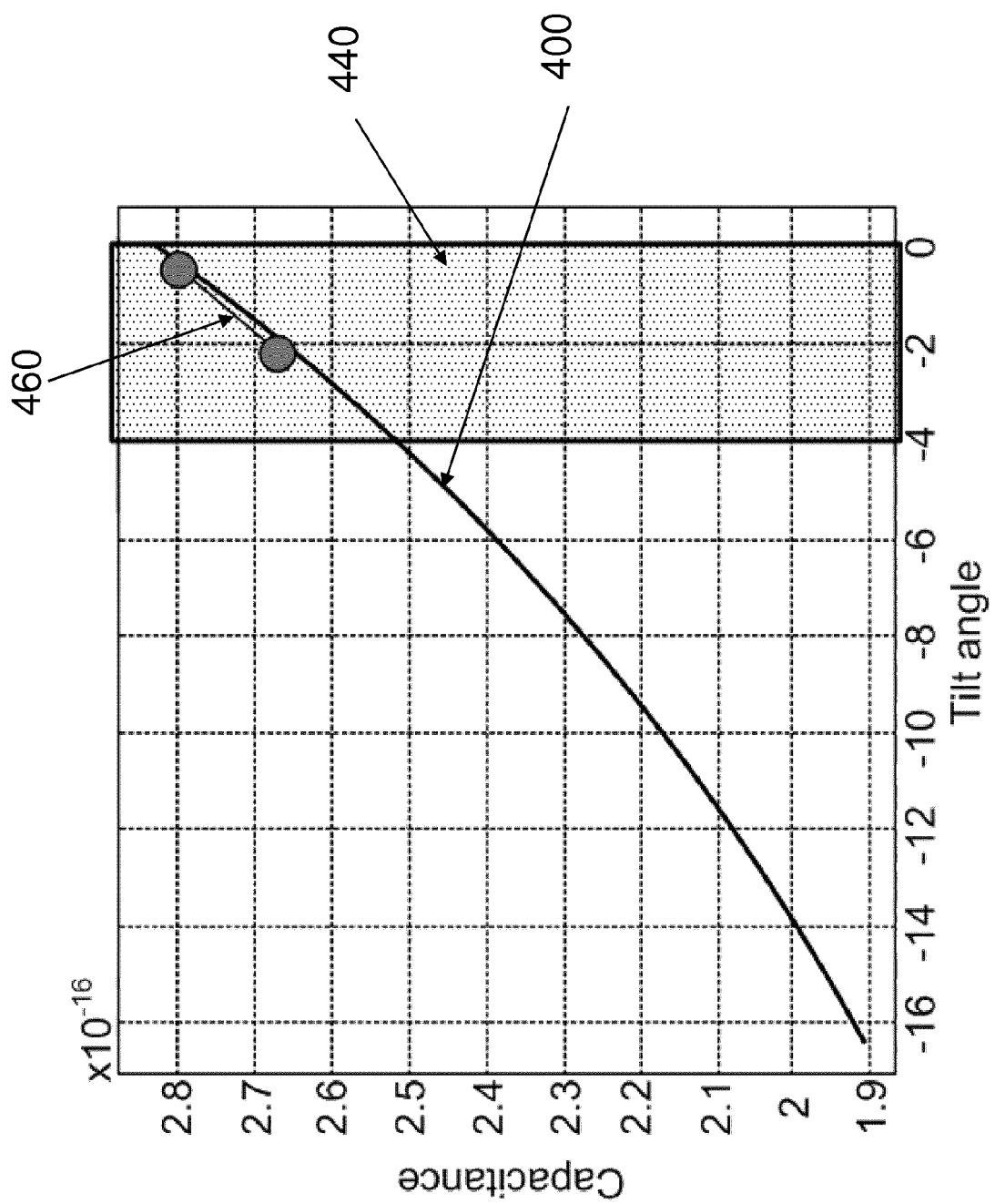
FIG. 24 is similar to FIG. 22 but illustrates the effect of stopper position on linearity.
Figure 25:
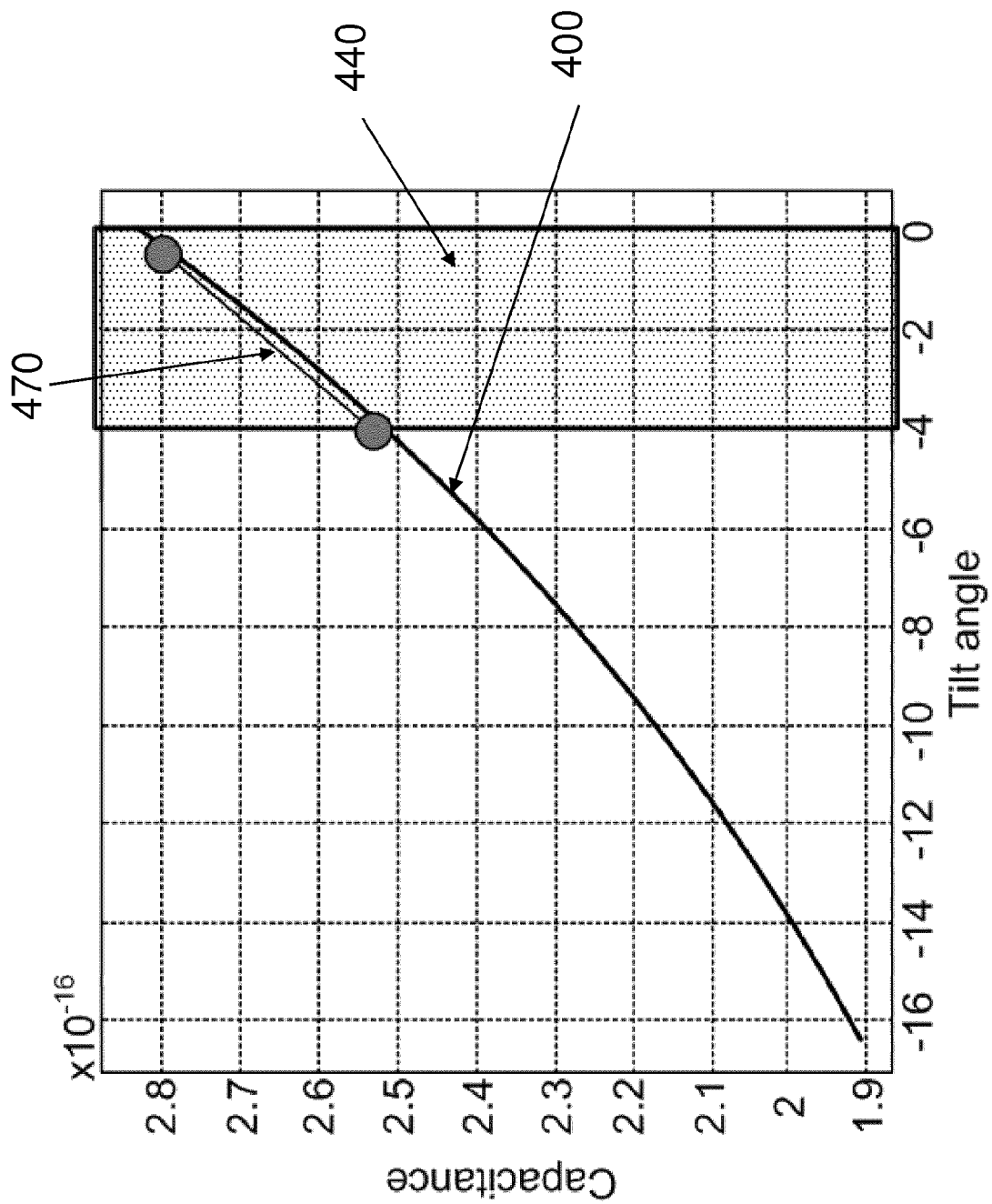
FIG. 25 is similar to FIG. 24 but illustrates an increase of linearity within the effective operating area.

In addition, the position of the stopper with respect to the tilt axis can be used to provide different ranges of sensitivity within the effective operating area 440. As shown in FIG. 24, the relationship between capacitance and tilt angle is linear over the range between approximately 0° and 2° for a downward tilt angle as indicated by line 460. By moving the stopper closer to the tilt axis, as shown in FIG. 25, the range of the linear relationship is extended to approximately 0° and 4° as indicated by line 470 within the effective operating area 440.

It has been found that charge builds up in micro-mirrors during operation which produces voltage drifts. By providing a conductive coating on the stoppers, a path is provided for the built up charge to discharge. This requires that the stoppers are decoupled from the actuation and measurement electrodes as described above.

Figure 26:
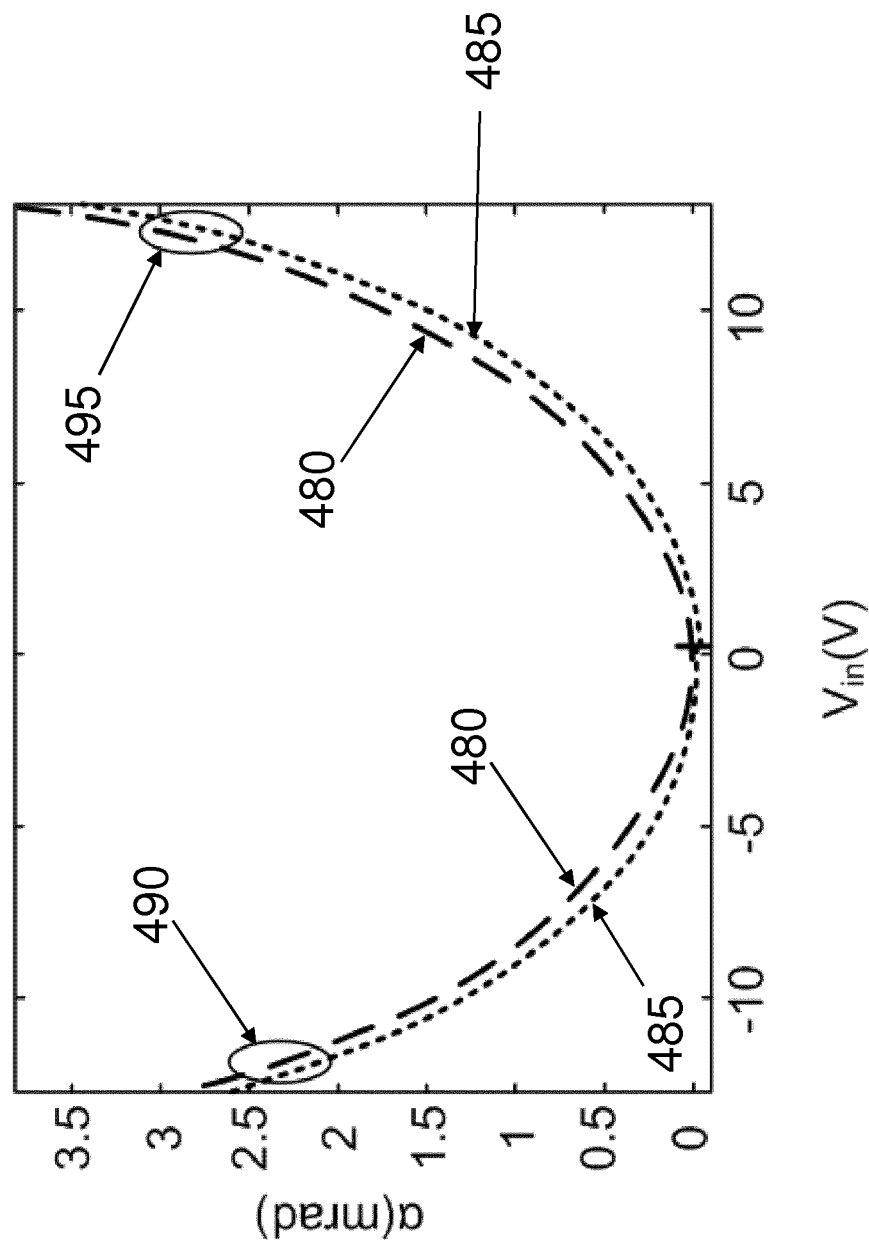
FIG. 26 illustrates a graph illustrating performance asymmetry of a symmetrically designed micro-mirror element.

It has been found that, by designing a micro-mirror element to be symmetric about its pivot point or tilt axis, there is still asymmetry in performance as shown in FIG. 26. In FIG. 26, a graph of illustrating maximum and minimum measurements corresponding to input voltage, curve 480 corresponds to maximum measurements and curve 485 corresponds to minimum measurements. Neither the curve 480, 485 is symmetric around the vertical axis which corresponds to an input voltage of $V_{in} = 0$. In addition on the left of the graph, for negative input voltage, there is a maximum difference of 0.29 mrad between the two curves as indicated at 490. Similarly, on the right of the graph, for positive input voltage, there is a maximum difference of 0.37 mrad as indicated at 495. By characterising this information and by predicting this expected process variation, each micro-mirror element can be designed with asymmetric actuation electrodes so that the performance of the micro-mirror element can be made to be symmetric. Similarly, stoppers and/or measurement electrodes can also be optimised, either individually or in conjunction with the actuation electrodes, for symmetric performance.

As a result of being able to optimise each individual element associated with a micro-mirror element to provide an asymmetric profile, flexibility of design is provided which can compensate for process variations.

The present invention has been described above with reference to tilting about a single pivot point or tilt axis. However, it will be appreciated that each micro-mirror element may tilt about more than one pivot point or tilt axis. In this case, two actuation electrodes, two measurement electrodes and two stoppers will be provided for each pivot point or tilting axis.

Although the present invention has been described with reference to two actuation and two measurement electrodes, it will be appreciate that any suitable number of actuation and measurement electrodes can be provided. It is essential, however, that the actuation and measurement electrodes are decoupled from one another.

In addition, the present invention is not limited to use with a polar grid array and can be used with any micro-mirror array where different properties are to be provided by different sections of the array.

Whilst the present invention has been described in relation to one specific embodiment, it will be appreciated that modifications can be made that fall within the scope of the present invention.

The invention claimed is:

1. A variable focal length lens comprising:
   a micro-mirror array having a plurality of micro-mirror elements arranged in at least a first section and a second section, wherein:
   each micro-mirror element has a tilt axis and comprises, on each of two opposing sides of the tilt axis, (i) at least one actuation electrode, (ii) at least one measurement electrode, and (iii) at least one stopper;
   each micro-mirror element in the first section has a first tilt angle range;
   each micro-mirror element in the second section has a second tilt angle range; and
   the first tilt angle range is less than the second tilt angle range.

2. The variable focal length lens according to claim 1, wherein:
   the at least one stopper of each micro-mirror element in the first section has a first height,
   the at least one stopper of each micro-mirror element in the second section has a second height, and
   the first height is greater than the second height.

3. The variable focal length lens of claim 2, wherein, for each micro-mirror element in at least one of the first section or the second section, the tilt axis is asymmetrical.

4. The variable focal length lens of claim 3, wherein, for each micro-mirror element in at least one of the first section or the second section, a height of the at least one stopper on one side of the tilt axis is greater than a height of the at least one stopper on an opposite side of the tilt axis.

5. The variable focal length lens of claim 1, wherein, for each micro-mirror element, the at least one actuation electrode and the at least one measurement electrode on each of the opposing sides of the tilt axis provide asymmetrical voltage sensitivity about the tilt axis.

6. The variable focal length lens of claim 1, wherein:
the plurality of micro-mirror elements is arranged as a polar grid,
the first section comprises an innermost section of the polar grid, and
the second section comprises an outermost section of the polar grid.

7. The variable focal length lens of claim 6, wherein:
the polar grid comprises a plurality of additional sections between the first section and the second section,
the tilt angle range of each micro-mirror element in each section differs from the tilt angle range of each micro-mirror element in each adjacent section, and
the tilt angle range progressively increases from the first section to the second section.

* * * * *